(12) United States Patent
Paresi

(10) Patent No.: US 10,724,973 B2
(45) Date of Patent: Jul. 28, 2020

(54) SYSTEMS AND METHODS FOR SCANNING PALLETIZED CARGO

(71) Applicant: IDSS Holdings, Inc., Armonk, NY (US)

(72) Inventor: Joseph S. Paresi, New York, NY (US)

(73) Assignee: IDSS Holdings, Inc., Armonk, NY (US)

( * ) Notice: Subject to any disclaimer, the term of this patent is extended or adjusted under 35 U.S.C. 154(b) by 115 days.

(21) Appl. No.: 16/041,521

(22) Filed: Jul. 20, 2018

(65) Prior Publication Data

US 2019/0041341 A1 Feb. 7, 2019

Related U.S. Application Data

(63) Continuation-in-part of application No. 15/875,641, filed on Jan. 19, 2018.

(60) Provisional application No. 62/448,983, filed on Jan. 21, 2017.

(51) Int. Cl.
*G01N 23/04* (2018.01)
*G01N 23/046* (2018.01)
*G01N 23/10* (2018.01)

(52) U.S. Cl.
CPC ........... *G01N 23/046* (2013.01); *G01N 23/10* (2013.01); *G01N 2223/321* (2013.01); *G01N 2223/3303* (2013.01); *G01N 2223/41* (2013.01); *G01N 2223/419* (2013.01); *G01N 2223/639* (2013.01)

(58) Field of Classification Search
CPC .. G01V 5/0016; G01V 5/0008; G01V 5/0066; G01V 5/0041; G01N 23/04
See application file for complete search history.

(56) References Cited

U.S. PATENT DOCUMENTS

| | | |
|---|---|---|
| 5,182,764 A | 1/1993 | Peschmann et al. |
| 2004/0247069 A1 | 12/2004 | Arai et al. |
| 2008/0232541 A1 | 9/2008 | Kang et al. |
| 2009/0060128 A1 | 3/2009 | Kang et al. |
| 2011/0142201 A1 | 6/2011 | Eberhard et al. |
| 2016/0231454 A1 | 8/2016 | Morton |

(Continued)

OTHER PUBLICATIONS

International Search Report and Written Opinion dated Apr. 12, 2018 in connection with International Application No. PCT/US2018/014490.

(Continued)

*Primary Examiner* — Don K Wong
(74) *Attorney, Agent, or Firm* — Wolf, Greenfield & Sacks, P.C.

(57) ABSTRACT

Provided are CT scanning systems and architectures that utilize a unique approach to scanning large objects. Various embodiments of the architecture incorporate a scanning platform and a turntable. The scanning platform may be mounted horizontally. The vertical offset between the scanning platform and the turntable may be changed during a scan. A pallet or other object can be moved into a scanning area under the scanning platform. Both the vertical offset between the scanning platform and the turntable may be changed and the turntable may be rotated during a scan. Scan data may be used to generate a three dimensional image. Additional objects can be quickly positioned (once the vertical offset is adjusted) for subsequent scans allowing for greater throughput than conventional approaches.

21 Claims, 25 Drawing Sheets

(56) References Cited

U.S. PATENT DOCUMENTS

2018/0031495 A1* 2/2018 Diehm ................ G01N 23/046
2018/0224569 A1    8/2018 Paresi

OTHER PUBLICATIONS

International Preliminary Report on Patentability dated Aug. 1, 2019 in connection with International Application No. PCT/US2018/014490.

International Search Report and Written Opinion dated Oct. 3, 2019 in connection with International Application No. PCT/US2019/41969.

* cited by examiner

SYSTEMS AND METHODS FOR SCANNING PALLETIZED CARGO

RELATED APPLICATIONS

This application is a continuation-in-part, claiming the benefit under U.S.C § 120, of U.S. patent application Ser. No. 15/875,641, entitled "SYSTEMS AND METHODS FOR SCANNING PALLETIZED CARGO," filed Jan. 19, 2018, which is herein incorporated by reference in its entirety. Patent application Ser. No. 15/875,641, filed Jan. 19, 2018, entitled "SYSTEMS AND METHODS FOR SCANNING PALLETIZED CARGO," claims priority under 35 U.S.C. § 119(e) to U.S. Provisional Application Ser. No. 62/448,983, entitled "A NOVEL APPROACH TO SCANNING PALLETIZED CARGO USING A HORIZONTALLY-MOUNTED COMPUTER TOMOGRAPHY SYSTEM, filed on Jan. 21, 2017, all of which are herein incorporated by reference in their entirety.

BACKGROUND

Cargo screening is a known major weakness in current aviation security systems. Traditional cargo screening solutions involve cutting open the shrink wrap around cargo pallets and performing a time-consuming trace screening, which is limited in the detection of explosives and the identification of anomalies within the palletized contents. Conventional X-ray solutions provide limited views for anomaly detection and are challenged in providing automated detection capabilities. Multi-view X-ray and pseudo/CT (Computer Tomography) approaches are also limited in anomaly and automated detection and tend to be cumbersome, costly, and have limited adoption. Electron beam solutions are also limited in the amount of power available for scanning and are prohibitively expensive.

While three-dimensional CT technology has been one of the most effective technologies for scanning, imaging and automating threat detection in aviation security, conventional use in scanning cargo is limited, inefficient, and costly.

SUMMARY

According to one aspect, a scanning apparatus is provided. The apparatus comprises a scanning platform including an emitter and a detector; a turntable configured to rotate responsive to control signals; a lift configured to change the vertical offset of the scanning platform relative to the turntable, responsive to control signals; and at least one processor. When executing, the at least one processor is configured to receive imaging data from the detector; generate control signals for moving the scanning platform along a z-axis; generate control signals for rotating the turntable; and capture x-ray attenuation data for an object in three dimensions.

According to one aspect, a scanning system for generating computer tomography ("CT") images is provided. The system comprises at least one processor operatively connected to a memory, the at least one processor when executing configured to activate a rotating turntable; change a vertical offset of a scanning platform including an emitter and a detector, relative to the turntable; and receive x-ray attenuation data from the detector.

According to one aspect, a method for capturing computer tomography ("CT") images of an object is provided. The method comprises activating, by at least one processor, a rotating turntable; changing a vertical offset of a scanning platform including an emitter and a detector, relative to the turntable, responsive to control signals from the at least one processor; and receiving, by the at least one processor, x-ray attenuation data from the detector.

According to one aspect, a non-transitory computer-readable medium comprising instruction, the instruction when executed cause a computer system to perform a method for capturing computer tomography ("CT") images of an object is provided. The method comprises activating, by at least one processor, a rotating turntable; changing a vertical offset of a scanning platform including an emitter and a detector, relative to the turntable, responsive to control signals from the at least one processor; receiving, by the at least one processor, x-ray attenuation data from the detector; generating a three dimensional image of an object from the x-ray attenuation data.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
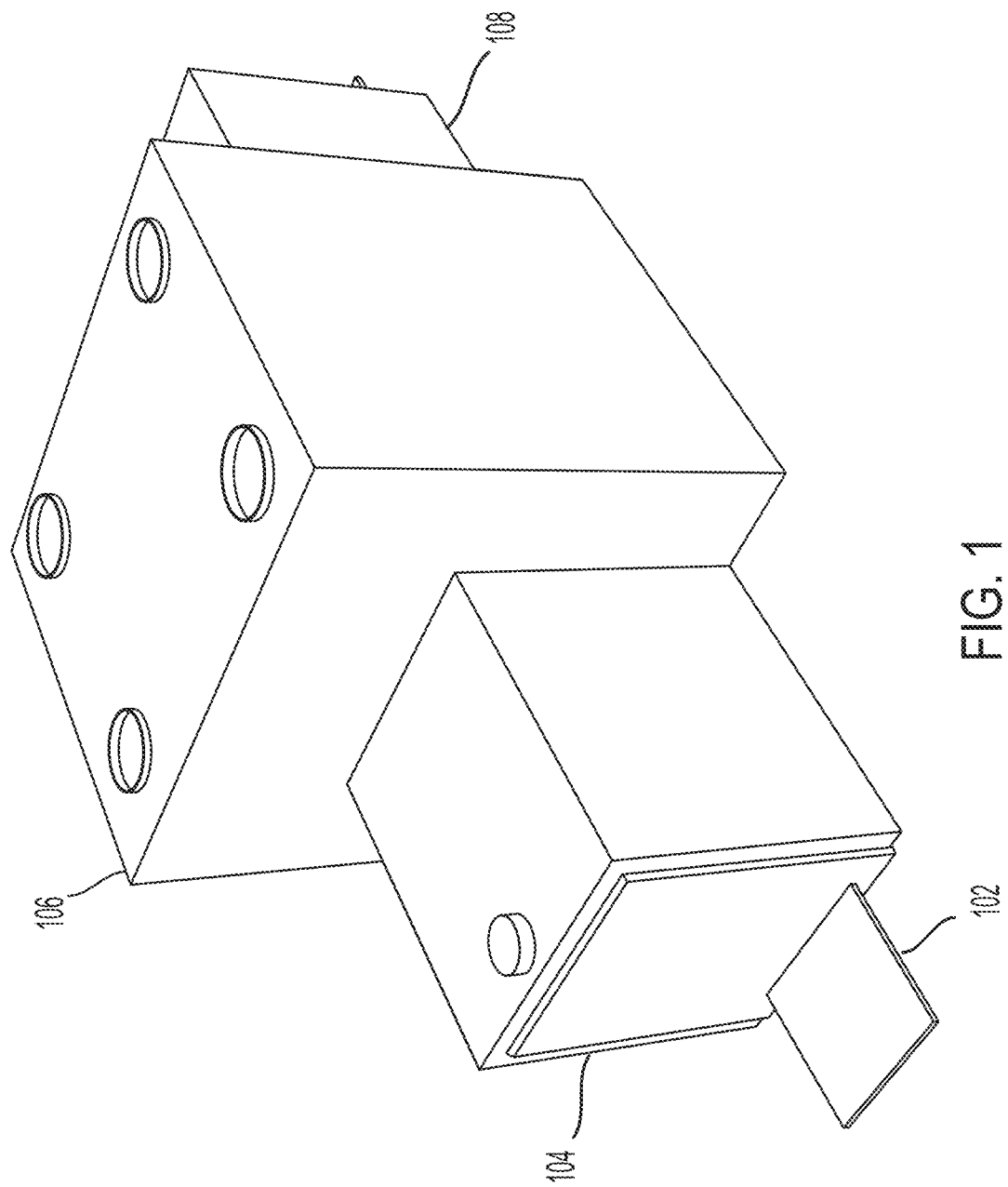
FIG. 1 is an external view of a scanning system, according to one embodiment.

According to various aspects, the scanning system includes a conveyor that accepts palletized objects from a forklift or other machinery. The conveyor moves the pallet through an entry aperture that can, in some examples, facilitate positioning of the pallet received from the forklift on the center of the conveyor. The entry aperture is sized to accommodate large pallets (e.g., C class pallets as defined by TSA). In other embodiments, the entry aperture can be sized to accommodate larger objects (e.g., larger width, height, and/or length). Once through the entry, the pallet is positioned by the conveyor under a scanning platform. For example, the pallet is positioned in the open space defined within a rotation member having a CT emitter and detector array. The object is scanned from all angles via the rotation of the rotation member, and scanned at all heights (e.g., along its Z axis) by raising or lowering the scanning platform. In one example, a scanning platform maintains an at rest position just above the height of an expected object (e.g., including the height of any base on which the object rests). The scanning platform can be lowered to the height of a pallet and a CT scan captured as the emitter and detector arrays are rotated around the object and raised along the object's height. A variety of detection algorithms can be used to analyze the returned scan information. For example, the detection algorithms can be used to identify potential explosives, weapons, anomalies in the object, among a number of other options.

According to aspects of the present application, the scanning system may include a conveyor that accepts objects that are to be scanned from a forklift or other machinery. In some embodiments, the objects may be palletized cargo, for example, the object may be positioned on a base which may be a pallet. The scanning system may include an entry aperture. The conveyor may move the objects through the entry aperture which may, in some examples, facilitate positioning of the object received from the forklift on the center of the conveyor. The entry aperture may be sized to accommodate large pallets (e.g., C class pallets as defined by TSA). In other embodiments, the entry aperture can be sized to accommodate larger objects (e.g., larger width, height, and/or length), and may also accept and position smaller objects. Once through the entry, the object may be positioned by the conveyor on a turntable.

According to one embodiment, the turntable may be circular. In some embodiments, the turntable may include a lift, or may be positioned over a lift. In some embodiments, the object may be at least partially positioned using rollers which surround the turntable. The object may be positioned under a scanning platform. For example, the object may be positioned in open space defined by such a scanning platform. The platform may include a CT emitter and a detector array or multiple arrays. In some embodiments, the object may be rotated by the turntable around a vertical axis, so that the object may be scanned from all angles (e.g., the object may be rotated about its Z axis). In some embodiments, the scanning platform may be raised and/or lowered along the vertical axis such that the object may be scanned at all heights (e.g., the platform may move along the Z axis). In some embodiments, the object may be raised and/or lowered by the turntable along the vertical axis such that the object may be scanned at all heights (e.g., the turntable may move along the Z axis) while the turntable is rotating.

In one example, a scanning platform maintains an at rest position just above the height of an expected object (e.g., including the height of any base on which the object rests). The scanning platform can be lowered to the height of a pallet and a CT scan captured as the object is rotated by the turntable and raised along the object's height. In another example, a scanning platform maintains an at rest position just above the height of an expected object (e.g., including the height of any base on which the object rests). The scanning platform can be lowered to the height of the object and a CT scan captured as the object is rotated by the turntable and lowered along the object's height to the height of the pallet. As with other embodiments, a variety of detection algorithms can be used to analyze the returned scan information. For example, the detection algorithms can be used to identify potential explosives, weapons, anomalies in the object, among a number of other options.

In further embodiments, the scanning system can be positioned over a well, depression or hole. According to one embodiment, the scanning platform (e.g., emitters and detectors can be position below the entry height of the object to be scanned (e.g., at or below conveyor belt height). The turntable can be configured to lower the object into the emission plane of a fixed scanning platform while rotating the object to be scanned. Once complete 3D image data is obtained, the object can be raised back to conveyor belt height and advanced through the system.

Various efficiency improvements are realized in various embodiments of the current architecture. In one example, once scanning is complete, the scanning platform occupies an unobstructed position. With the scanning platform in an unobstructed position (e.g., above the height of a scanned object), the pallet or object can be moved automatically by the conveyor through an exit aperture, while subsequent objects are being transitioned into the scanning area through the entry aperture. Various models of some embodiments indicate scanning rates in excess of 20 pallets or skids per hour.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 illustrates an external view of an example embodiment of a scanning system 100. At 102 a palletized object or pallet (e.g., supported on a skid) for scanning can be placed on a conveyor 102. The conveyor feeds the pallet into an entrance tunnel 104. In some examples, the conveyor 102 can be motorized and operate automatically. For example, the conveyor can be triggered upon detection of a threshold weight on the conveyor (e.g., greater than weight of a skid). Various sensors are available for weigh detection, and a computer system (not shown) may control conveyor operation responsive to weight, motion detection, etc.). In some embodiments, additional positioning bars may be constructed within or around the entrance frame 104. For example, the positioning bars can be constructed to ensure a standard size pallet (e.g., class C pallet) is positioned in the center of the conveyor. The positioning bars can continue into the scanning frame 106 to ensure centering of an object. According to one embodiment, a scanning platform or CT gantry is housed within the scanning frame 106. The scanning platform or CT gantry is shown and described with greater detail below with respect to FIG. 2.

As the pallet is positioned within the center of conveyor the conveyor positions the pallet in the center of the scanning frame 106. Once centered, the scanning platform or CT gantry can be lowered into a scanning position at the base of the object. X-ray emitters and detectors are rotated about the object as the scanning platform is raised over the height of the object. The resulting data can be directly visualized as a three dimensional model of the contents of the scanned object. Further processing can include anomaly or threat detection based on the scan data.

According to some embodiments, scans of the object are executed from the base of the object to the top of the object, although scanning can occur in the opposite direction. Once scanning is complete the scanning platform is returned to a position above the object, permitting the object to be moved through an exit tunnel 108 on the conveyor. The positioning of the scan platform above the object to be scanned allows for efficient introduction of pallets and queuing of subsequent pallets/objects to be scanned. For example, the conveyor can have multiple independent sections that enable feeding of a first object and queuing of a second object, such that as the first object is scanned the next object travels only a short distance to a centered position under the scanning platform.

Figure 2:
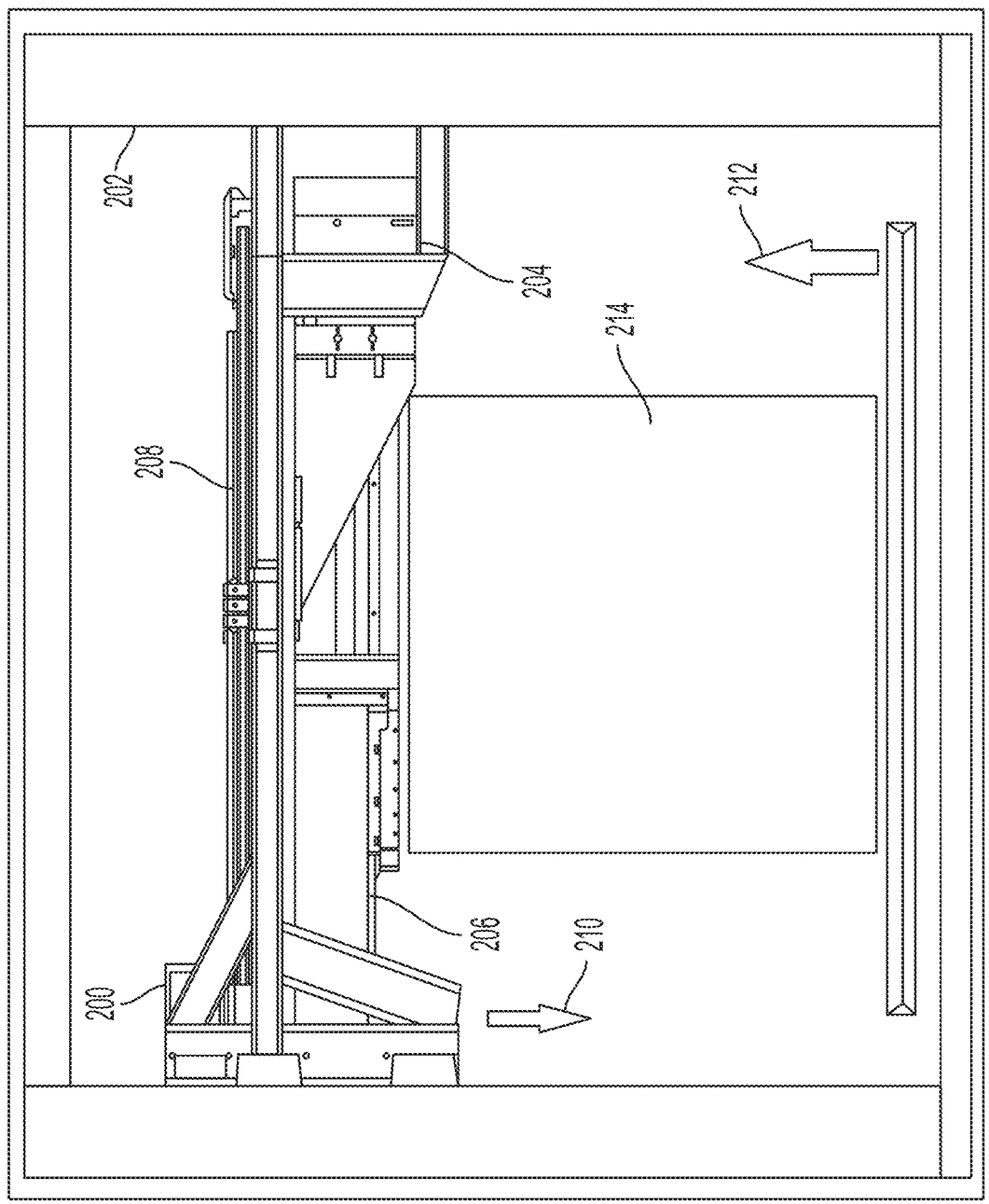
FIG. 2 is an internal view of a scanning system, according to one embodiment.

FIG. 2 shows an example internal view of an embodiment of the scanning system (e.g., 100 of FIG. 1), and in particular the CT gantry 200 housed within a scanning frame 202. According to various embodiments, the CT gantry 200 can include a scanning subsystem comprising an x-ray emitter 204 and a plurality of detectors 206, the emitter and some detectors positioned on opposite ends a rotating member 208. Addition detectors may also positioned adjacent or around the emitter to capture return signals.

According to some embodiments, the rotating member 208 is a circular member, and the emitter and at least some detectors are positioned on opposite sides of the circular rotating member 208. As is known, x-ray attenuation data obtained by passing x-rays through an object allow construction of a model of the scanned object. In some embodiments, the CT gantry 200 can be lowered (e.g., arrow 210) into a scan position at the base of the object 214. Scanning can commerce and include rotation of the emitter and detectors around the object 214. Then the CT gantry 200 is raised (e.g., arrow 212), which can occur a rate of 1.5 cm/s to provide a scan rate of approximately 27 C-sized objects per hour.

According to various embodiments, the CT gantry or scanning platform can be constructed and include some off the shelf components, for example, a 320 kilovolt 4500 watt high voltage power supply pair which provides 14 mA of current and matching x-ray. In other embodiments, increased voltage sources can be used to improve scanning penetration on an object and assist with scanning of higher density objects (e.g., 450 kilovolt 4500 watt supply). In some examples, the scanning platform is constructed to allow switching between the lower voltage x-ray source and the higher voltage x-ray source.

Additional embodiment, can use any x-ray source at any power level, within a horizontally oriented CT gantry, and the 320 and 450 kv sources are examples for illustration. Other embodiments, can also incorporate multiple energy sources or multiple energy detectors (some detectors are configured for dual energy detection and further detectors can be configured for more than two energies). In some examples, obtaining dual energy readings can be done either by using two difference sources or using filtered detectors or energy measuring detectors. In further embodiments, the system and/or CT gantry can be single or multi-energy discriminating, with correspond processing algorithms.

In some embodiments, the scanning platform includes a plurality of rows of x-ray detectors (e.g., 6 rows can be used to provide 1.94 millimeters of resolution at isocenter) e.g., at 206. In some examples, the power supply, x-ray, source, and detectors can include a 320 kV X-ray source with a 2 mm Focal Spot and 6 rows of cadmium tungstate (CdWO4) detectors—which together provide the 1.94-millimeter resolution at isocenter. In some examples, fewer detectors may be used (e.g., 4 rows of 1024 detectors can be used), also in other examples additional detectors can be used to improve scan resolution and/or scanning speed. In further embodiments, multiple scanning platforms each with their own emitter and detectors can be utilized to scan an object at multiple heights simultaneously. In some examples, the use of multiple scan platforms provides increased scan speed, although the increased scan speed can be accompanied by additional complexity in the architecture and control algorithms.

In further embodiments, known reconstruction algorithms can be used in conjunction with the horizontally oriented scan platform and resulting scan data. For example, known reconstruction algorithm from the DETECT™ Checkpoint Scanner can be integrated into the disclosed scanning systems.

Stated generally, reconstruction algorithms can be tailored in various embodiments to the geometry of the computer tomography design. Examples can start by using an existing reconstruction algorithm. Typically, reconstruction algorithms do not know or care that the CT gantry is horizontal. Thus, various embodiment tailor the reconstruction algorithm to address the number of detectors used (for example, including the number of rows and number of detectors per row), the size of the detectors, and the number of CT slices taken as the gantry rotates around the pallet. According to one example, the system can capture 4 images for every degree=4×360–1440 images, and tailor reconstruction accordingly. Typically the more images the better for reconstruction, but various embodiment balance improved imaging with taking too long to process.

Additionally, DETECT™ Checkpoint Scanner detection algorithms can also be integrated. Further examples execute a Stratovan-compliant Digital Imaging and Communication in Security ("DICOS") standard imaging protocol, and yet other examples can include DETECT™ Operator Controls and Display Checkpoint interface displays. In still other examples, a Common GUI can be provided for use with the system (e.g., compliant with TSA guidelines for GUI interfaces). Further embodiments are also configured with standard serial test interface program (STIP) interfaces, providing utilization consistent with existing and any future capabilities—which, for example, include associated cyber security applications that are compliant with TSA standards.

Figure 3:
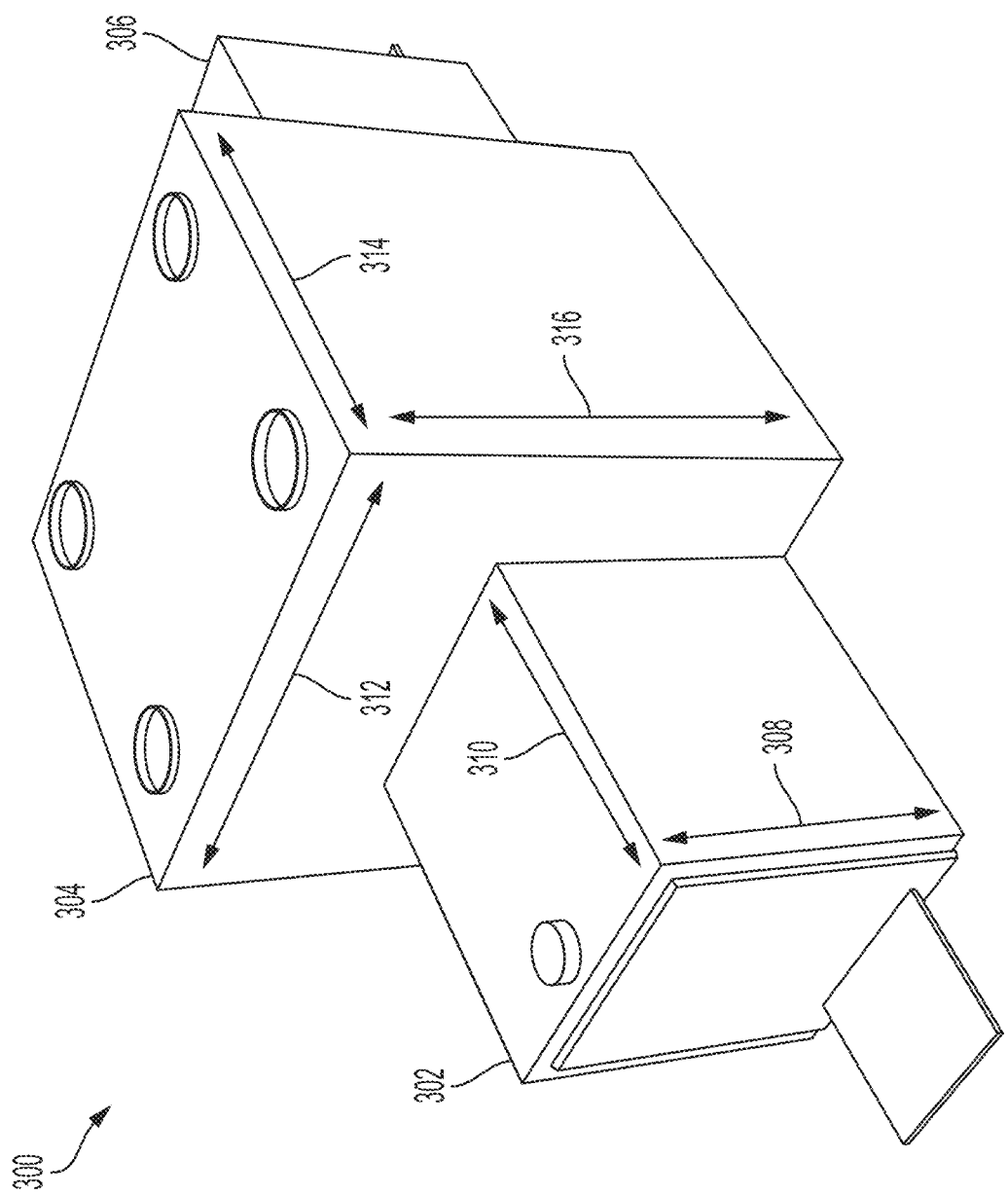
FIG. 3 illustrates example dimensions of a scanning system, according to one embodiment.

FIG. 3 shows an example embodiment of the scanning system 300 and associated dimensions. For example, the entry aperture 302 can be constructed to accommodate class C objects (as well as larger dimensioned objects). The scan frame 304 is constructed so class C objects can be moved underneath a scanning platform (not shown), and the exit aperture 306 also constructed so the scanned objects can be easily removed from the scanning system. Additional embodiments include sizing to accommodate taller objects, for example, up to eight four inches adding approximately 20 inches to each height dimension (e.g., 308 and 316) shown in FIG. 3.

According to one embodiment, the dimensions for the entry can include at 308 ninety five inches, by seventy eight inches at 310. The scan frame can measure one hundred thirty seven inches at 312, one hundred eighteen inches at 314, and one hundred twenty inches at 316, with the exit aperture 306 sized similarly to the entry aperture 302.

Known classifications of scan objects provided by TSA include: class A—Small defined as 49 cm Long×91 cm Wide×38 cm High, up to 50 kg (19.29" Long×35.83" Wide×14.96" High); class B—Medium defined as 80 cm Long×120 cm Wide×60 cm High, up to 100 kg (31.5" Long×47.25" Wide×23.62" High); and class C—Large defined as 122 cm long×122 cm Wide×153 High, up to 1000 kg (48.03" Long×48.03" Wide×60.25" High). Further, in order to comply with examples standards, various scanning systems must achieve scan rates for each class including: A—50 pallets/hr; B—50 pallets/hr; and C 20 pallets/hr. Various embodiments of the scanning system provide the identified scan rates for each class and/or exceed the identified scan rates.

According to further embodiments, the scanning system addresses the most challenging C size cargo pallets (of 48 inch by 48-inch-wide by 65 inch high), for example, based on the dimensions described in FIG. 3. Additional embodiments provide for scanning of objects of greater height. For example, various embodiments are dimensioned to receive and scan objects measuring up to thirty six inches by thirty six inches (length by width) and having a height of up to eight four inches.

By utilizing a horizontally-mounted computed tomography (CT) solution, the scanning system architecture minimizes the size of the Gantry/slipring needed to provide a rotating CT member, and further maximizes the photon energy penetrating the object to be scanned (e.g., a pallet). Various implementations also enable the ability to scan as objects in as little time as 110 seconds per pallet (assuming 65 inch height). To provide a benchmark with the 110 seconds to scan, adding in the time to move the pallet into place for scanning, embodiments of the current system can scan as many as 27 pallets per hour. Further embodiments can improve this rate using, for example, additional detector rows.

As discussed above, the system includes a horizontally mounted Computed Tomography scanning array that is moved up and down on at least a pair of supports. The movement up and down (e.g., along a z-axis) can be executed by commercially available motorized lifts responsive to control signals provided by the system. Further, the opening of the CT scanning platform or CT gantry (e.g., 200, FIG. 2) accommodates 48 inch×48 inch pallets—which can be lifted above the pallet's 65 inch height, allowing the pallet to be moved into position underneath the platform or gantry. Once an object is positioned, the CT gantry is lowered around the pallet to perform the full 3D CT scan in approximately 110 seconds.

Various embodiments are constructed with detectors that provide 1.94-millimeter resolution at isocenter (e.g., 6 rows of 1024 detectors), which provides extremely high resolution to detect anomalies and offers a high level of automatic target recognition based on the pallet density. Some additional embodiments can provide a lower resolution and/or provide decreased scan time using the same power, x-ray source, and detectors.

Modelling of known pallet characteristic provide data that indicates current embodiments can scan over 80% of all pallet types and automate the detection of items such as weapons, narcotics, and explosives, among other options. As discussed above, the architecture of various embodiment is quite resilient and provides for over 10-year expected operational life.

Figure 4:
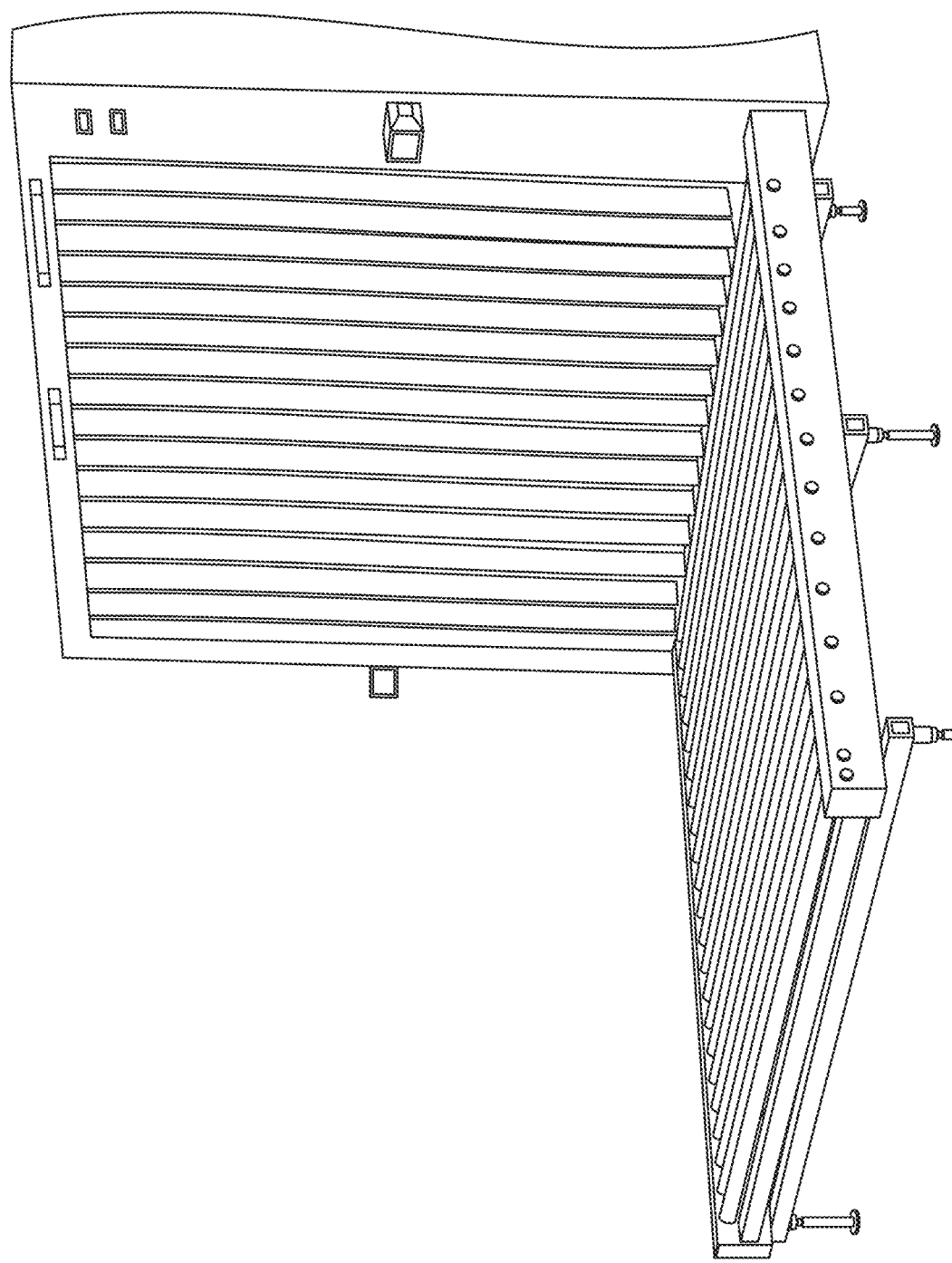
FIG. 4 is a view of an entry portion of a scanning system, according to one embodiment.

FIG. 4 is an example embodiment of entry portion 400 for a scanning system. As discussed above, some embodiments include guide ramps for position the objects to be scanned in the center of the entry. Additional embodiments can include actuators for moving scanned objects into a scanning space (e.g., into the open space defined by a scanning platform). In other embodiments, the scanning system can include visual detectors to confirm a scanned object is within the defined open space, and avoid collisions between scanning elements and the object.

Figure 5:
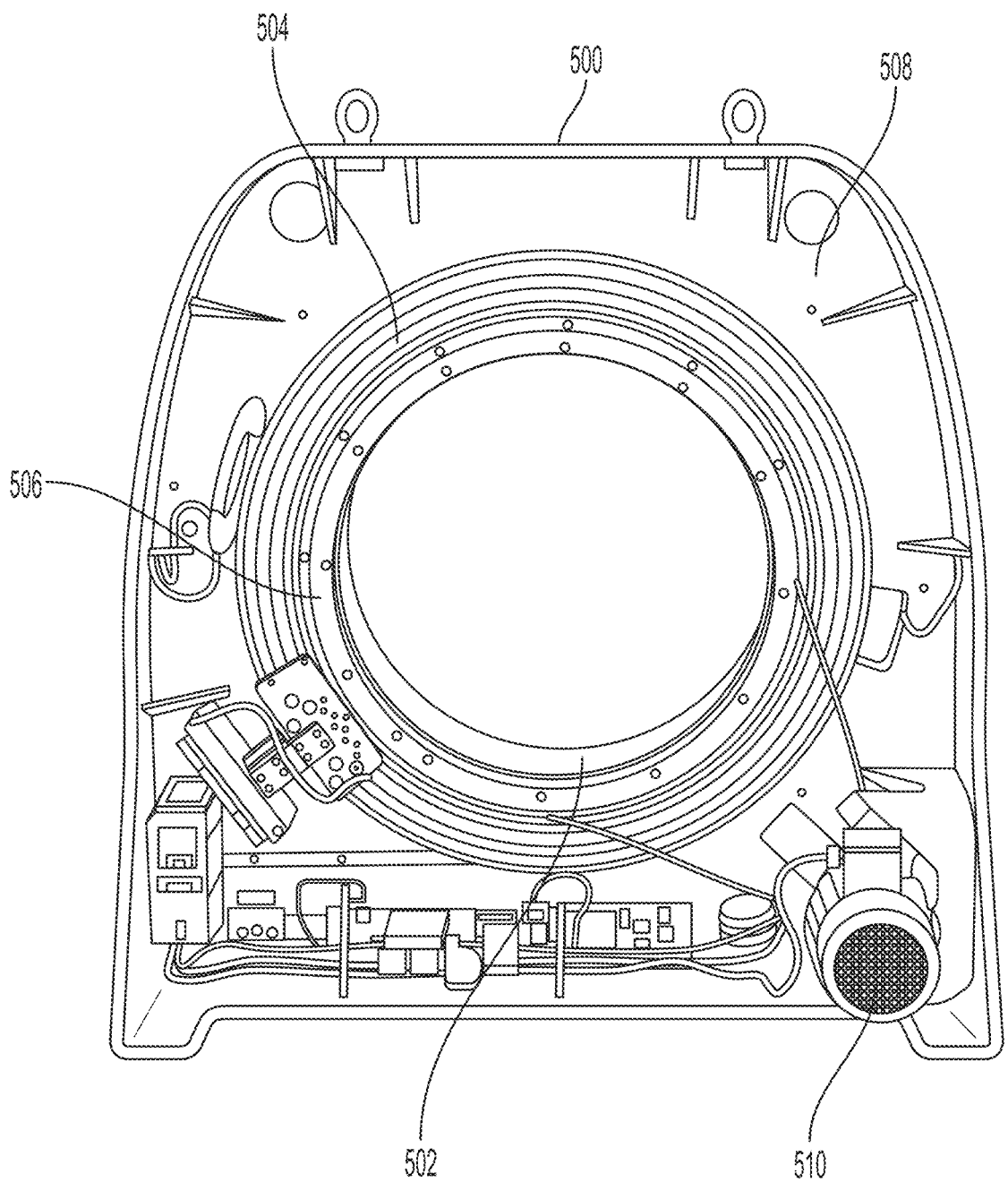
FIG. 5 is an example of components included in a scanning platform, according to one embodiment.

FIG. 5 shows example components of a rotate-rotate CT design and supporting gantry 500. According to one embodiment, a welded-tube steel gantry 500 with a traditional CT bearing 502 is used to support and rotate the scanning components of the system (e.g., emitter and detectors). The large bearings construction has been selected based on historic performance—and has performed extremely reliably in the field. According to one example, the rotation speed is 60 RPM effectuated by a rotation motor 510 to support the penetration and resolution targets. Further examples are constructed to provide streamlined architecture having a reasonable resulting detector pitch. Detector pitch is used and is defined as table distance traveled in one 360° gantry rotation divided by beam collimation. For example, if the distance traveled was 5 mm in one rotation and the beam collimation was 5 mm then pitch equals 5 mm/5 mm=1.0.

Further embodiments enable ample resolution in the Z axis (e.g., upward) for the cargo pallet scanner. According to other embodiments, power and control signals are transmitted to the rotating portion using a traditional CT slip ring 504. A non-contact capacitive data-link 506 is configured to transmit data. Various embodiments are constructed with a two (2) meter wide gantry frame 508 that provides the needed clearance for scanning large (e.g., class C) pallets. Not shown in FIG. 5, the x-ray source and detector spine assembly are mounted on the opposite side of the gantry.

According to another aspect, various software applications can be implemented to provide automated anomaly detection and/or threat detection. In further embodiments, imaging chain software is implemented to provide conversion of raw CT projections into 3D representations. For example, imaging chain software executes on the system that is configured to convert raw CT projections into an image. The converted image can also be presented and analyzed by various automated detection algorithms. In some settings the system can be configured to provide off-line image reconstruction (i.e., off load computational work to other computer system), as well as configuration to execute image construction/conversion in near real time.

According to one embodiment, the system uses the complete set of projection data for reconstruction and display of full three-dimensional image sets, that can be rotated and viewed from any angle is a user display. Three-dimensional image construction also enables for the interrogation of items that are behind other items in the display. Further embodiments, allow many objects to be cleared that would normally trigger shield alarms in conventional x-ray and multi-view x-ray systems. In addition, objects that are difficult to recognize from a particular view can always be rotated to the ideal angle for object recognition. Further embodiments, include various application programming interfaces implementing the TSA DICOS standard for image file transfers, which enables simplified remote screening and multi-operator viewing.

According to various embodiments, the generated image is available for direct display on the system. In one example, the image can be displayed directly on a screen attached to the scanning system. In parallel with the display, the image will be analyzed with software detection algorithms for automated threat detection. As threat/anomaly detection is executed, the display of the image can be highlight to show any potential issues, area that could not be scanned, matches to threat profiles, etc., which can include automated weapons detection.

According to various embodiments, the scan time for a C-pallet is approximately 110 seconds. This scan time thus is available for reconstruction and analysis of the image—even before presenting it to the operator in near real time.

Figure 6:
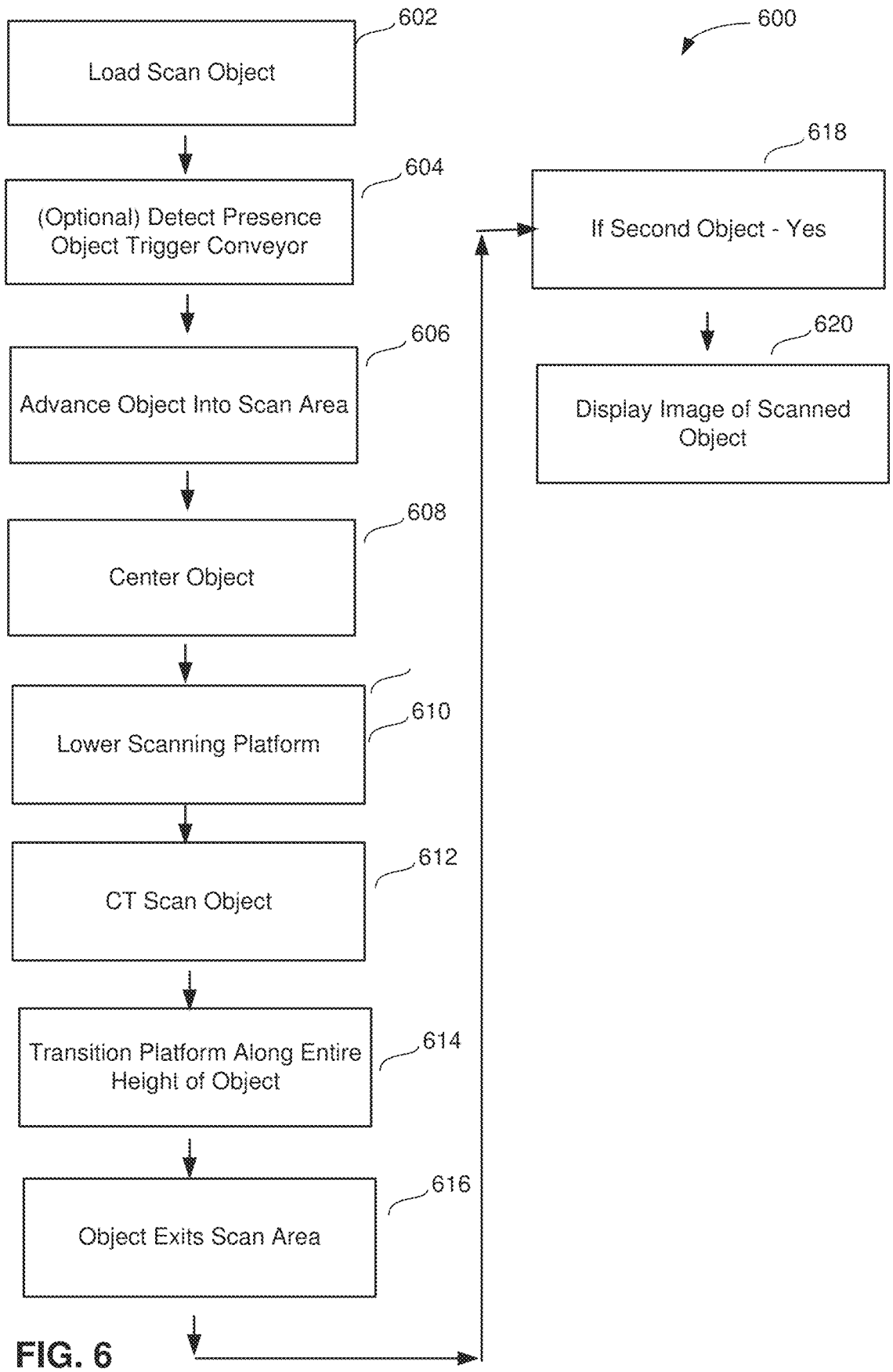
FIG. 6 is an example process flow for capturing CT data, according to one embodiment.

FIG. 6 illustrates an example process flow 600 capturing CT data. The process flow 600 can be executed by a scanning system (e.g., shown FIGS. 1-5). Process 600 begins at 602 with loading an object (e.g., a pallet) to be scanned onto a conveyor belt. Optionally, at 604 the system can detect the presence of the object (e.g., via weight, light or motion sensors, among other examples). At 606 the conveyor belt is activated to advance the object into a scanning area.

According to one embodiment, the conveyor feed and exit moves at a speed of 20 cm/sec. Such conveyors are can be used with conventional x-ray cargo pallet scanners, and are capable of moving the object into position for the Horizontal CT in approximately twenty-five (25) seconds from initial loading. In various embodiments, follow-on objects (e.g., pallets) can be staged and centered for scanning within another ten (10) seconds by queuing the objects on the conveyor. The actual time for the CT subsystem to be lowered into position and to scan an entire 65 inch high pallet is approximately 8.3 seconds and the scan time per C pallet is 110 seconds.

Accordingly, the system provides before any margin, a throughput of up to 27 pallets per hour using six (6) rows of detectors. As discussed above, another option includes reduce the number of rows to only four (4) to create additional resource benefits. However, to provide a target scan rate of at least 20 pallets per hour with a comfortable safety margin one design is constructed with six (6) detector rows.

At 608, the object is moved into a center position of the CT area and radiation doors are shut for safety. In some embodiments, positioning ramps are constructed on either side of the conveyor belt to facilitate centering of the object in the CT area. In other embodiments, actuators or push arms can be configured to center the object. Further, various sensors can facilitate or validate a centered position.

At 610, a CT Gantry is lowered to the bottom of the object (e.g., pallet) and the imaging of the pallet begins at 612. For example, at 612, the CT gantry is triggered to rotate at a speed of 60 revolutions per minute (RPM) (e.g., which is sufficient to obtain the 360° scan at a pitch of 1.29). Tat 614, the CT gantry or scanning platform is moved upward. For example, the movement of the gantry is executed at a rate of 1.5 cm/second to complete the entire scan. In some embodiments, lifting motors are given control signals to lower the gantry or platform into place and then raise the gantry or platform to fully scan the object.

Once the object is completely scanned, the radiation doors can open at 616, and the object exits the CT area by operation of the conveyor belt. Optionally at 618, if a second object is present to scan, the queued object enters the CT area as the first object leave, re-executing steps 608 on. According to various embodiments, the generated image (from the CT scan) is displayed to an end user in near instantaneous time as the reconstruction occurs incrementally during the pallet scan (e.g., at 620).

Various embodiment contemplate different detectors for use in the scanning system. In some embodiments, increased penetration of high-energy x-rays requires detectors with significant stopping power. In one example, cadmium tungstate (CdWO4) is employed to provide a detector with high stopping power.

In some examples, the detectors are constructed with a size of 3.8 $mm^3$ to provide after magnification a 1.94 $mm^3$ resolution at isocenter. According to one embodiment, the design incorporates six (6) rows of 1024 Detectors to cover the required Field of View. Each detector block will consist of 128 detectors and be aligned into a detector assembly (referred to as the "Spine Assembly"). Each detector block includes associated Analog to Digital converters and the boards are mounted in the spine assembly to allow for easy maintenance. According to one embodiment, the system has built-in graceful degradation and can operate with up to 3% non-adjacent failed detectors.

Additional implementation can include hardware and software based scatter solutions. For example, the large capacity cargo scanner can include a calculated scatter subtraction in addition to any hardware anti-scatter system (scattered photons are expected to peak at an energy just below 300 keV). At this energy, anti-scatter plates can be used but combined with additional software based subtraction to enable a low scatter fraction for accurate determination of density. According to one embodiment, the design of the anti-scatter system includes analysis of the output of the live simulation study and test program. Various embodiments are provided to handle different peak energy levels to cover scenarios having varying peak energies.

Some example design specifications are provide in the following tables. Various embodiments can implement any one or more of the following design elements and should not be viewed as limiting any one embodiments to the listed specification.

TABLE I

Pallet Size Data for Calculations

| Pallet Type | A | B | C |
|---|---|---|---|
| Pallet Length (mm) | 490 | 800 | 1220 |
| Pallet Width (mm) | 910 | 1200 | 1220 |
| Pallet Height (mm) | 380 | 600 | 1651 |

Table I provides size information in mm for multiple classes of scanned objects—Class A, Class B, and Class C.

TABLE II

Example CT Section and Gantry Dimensions

| CT Section and Gantry Size Calculations | | Comments |
|---|---|---|
| Minimum Diameter for 48" Pallets (mm) | 1725 | Diameter of 48" × 48" Pallet |
| CT Diameter Opening Margin | 225 | Open Space from Pallet to CT Gantry Start |
| CT Gantry Disk Opening from Pallet with Margin | 1950 | |
| Gantry Mounting Area for HVPS/X-ray and Detector Array | 550 | Based on Comet 320 Kv and 450 Kv HVPS Dimensions (498 mm wide) plus Margin (52 mm) X-ray Tube in Middle of Mounting Area |
| Gantry/Schliefring Size (Total Diameter, mm) | 2500 | Gantry and Slipring from Schleifring Connecticut |
| Space from Gantry Edge to Frame and Covers | 500 | Assumes Lift Motors Perpendicular to Tunnels (CT Subsection is Wider than Deep, so Not Part of this Spacing) |
| Total CT Section Distance from Input to Output | 3000 | |

Table II details example dimensions for one embodiment of a scanning system.

TABLE III

Example Calculations For CT Scanner Design

| Calculations for Cargo Pallets CT Design | | | | Comments |
|---|---|---|---|---|
| Circular FOV | 1803 | 1803 | 1803 | |
| Rectangle FOV (mm) | 1275 | 1275 | 1275 | need a little clearance from 48 inch pallet |
| Rectangle FOV (mm) | 1275 | 1275 | 1275 | 2*SQRT((B3/2)^2 − (B4/2)^2) |
| Focal setback from circular FOV (mm) | 150 | 150 | 150 | distance from edge of aperture to focal spot |
| Detector setback from circ FOV (mm) | 50 | 50 | 50 | distance from edge of aperture to scintillator surface |
| Source to Isicenter Distance SID (mm) | 1052 | 1052 | 1052 | source to isocenter distance |
| Source to Detectors Distance SDD (mm) | 2003 | 2003 | 2003 | source to detector distance |
| Magnification | 1.90 | 1.90 | 1.90 | magnification of the isocenter image onto the detector |
| Fan Angle (Degrees) | 114 | 114 | 114 | |
| Spine arc length (mm) | 3983 | 3983 | 3983 | |
| Detector size at Isocenter (mm) | 2.00 | 2.00 | 2.00 | image of the detector at isocenter |
| Detector actual size (mm) | 3.81 | 3.81 | 3.81 | |
| Dead Space Between Detectors (mm) | 0.10 | 0.10 | 0.10 | Space between Detectors |
| Detector Pitch (mm) | 3.91 | 3.91 | 3.91 | |
| Number of columns of detectors (fan direction) | 1018.79 | 1018.79 | 1018.79 | Round to 1024 |
| Number of Rows (cone direction) | 6 | 6 | 6 | |
| Detector Size in Z at Isocenter (mm) | 1.94 | 1.94 | 1.94 | |
| Swath (mm) | 11.64 | 11.64 | 11.64 | |

Table III details example dimensions according to one embodiment of the scanning system.

TABLE IV

| Pitch Calculation | | Comments |
|---|---|---|
| # of 1024 Detector Rows | 6 | |
| Size of Detector at Isocenter in Z Direction (mm) | 1.94 | Approximately 2X Magnification for 1.94 mm at Isocenter |
| Resultant Multi-Detector Coverage Area (mm) | 11.64 | = # Rows × Det Size |
| Rotational Speed of CT Gantry (RPM) | 60 | Gantry Rotational Speed fairly Low with ~6G of Force |
| RPM-mm | 698.4 | Coverage Area × Gantry Speed |
| Over 60 minutes (×RPM) | 60 | |
| Total Length Covered per swath | 11.6 | |
| CT Upmoving Scan Motor Speed (mm) (aka Belt Speed) | 15 | Estimated Speed on Linear Motor Rising CT Upward |
| Pitch Value | 1.29 | Extremely Low Pitch Offers Better Time on Target and Higher Photon Capture per Rotation |

Table IV provides example computations for a pitch value according to one embodiment.

TABLE V

Horizontal CT Scan Time per Pallet

| | | | |
|---|---|---|---|
| Area Covered per Horizontal Rotation | 11.64 | 11.64 | 11.64 |
| Affect of Pitch on Swatch Area Covered | 15 | 15 | 15 |
| Time to Scan Pallet Height Based on Pallet Height and CT Swaths Width (sec) | 25.33 | 40.00 | 110.07 |

Table V describes example calculations for estimating a time to complete a full scan for each class of object (Class A—25.33, Class B—40.00, and Class C 110.07), according to one embodiment.

TABLE VI

| First Pallet followed by Back-to-Back Pallet Queue with Minimal Spacing | | | | Comments |
|---|---|---|---|---|
| Time to Put Pallet Into Starting Position | 15.00 | 15.00 | 15.00 | Next Pallet Waits in Input Tunnel Until CT Scan is Complete (Minimal Spacing Required) |
| Time to Put CT into Starting Position (Bo | 10.00 | 10.00 | 10.00 | |
| Time to Scan Pallet Based on Pallet Heig | 25.33 | 40.00 | 110.07 | |
| Total Time to Scan a Single Pallet | 50.34 | 65.00 | 135.07 | |
| Throughput with Queued Pallets | 72 | 55 | 27 | |
| Reported TSA Throughout Requirement | 50 | 50 | 20 | Sufficient Margin |

Table VI describes example calculations to determine a scan throughput for each class of scanned objects, according to one embodiment.

According to another aspect, when designing a CT system for the three dimensional analysis of cargo pallets, the inventors realized that the solution was not just a repackaging of a previous explosive detection system ("EDS") design. As such, the inventors evaluated potential options and concluded that a horizontally mounted approach would limit the size of the gantry and maximize the x-ray power that can be applied to the pallet being scanned. In further embodiment, the inventors selected a source (x-ray) that balanced the requirements for penetration and resolution while offering a suitable solution to a majority (>80%) of the technical requirements for scanning pallets. Additionally, various embodiments were constructed so that increased voltage/x-ray source generators could be readily swapping in if x-ray source requirements need to expand. Further embodiments incorporate a detector array designed with sufficient resolution for both anomaly and automated explosive detection. The array provides enough channels to image an entire pallet in 110 seconds and provide images at isocenter with a resolution of 1.94 mm.

Figure 7:
FIGS. 7-18 illustrate a hypothetical execution of the scanning functions described herein.
Figure 8:
Figure 9:
Figure 10:
Figure 11:
Figure 12:
Figure 13:
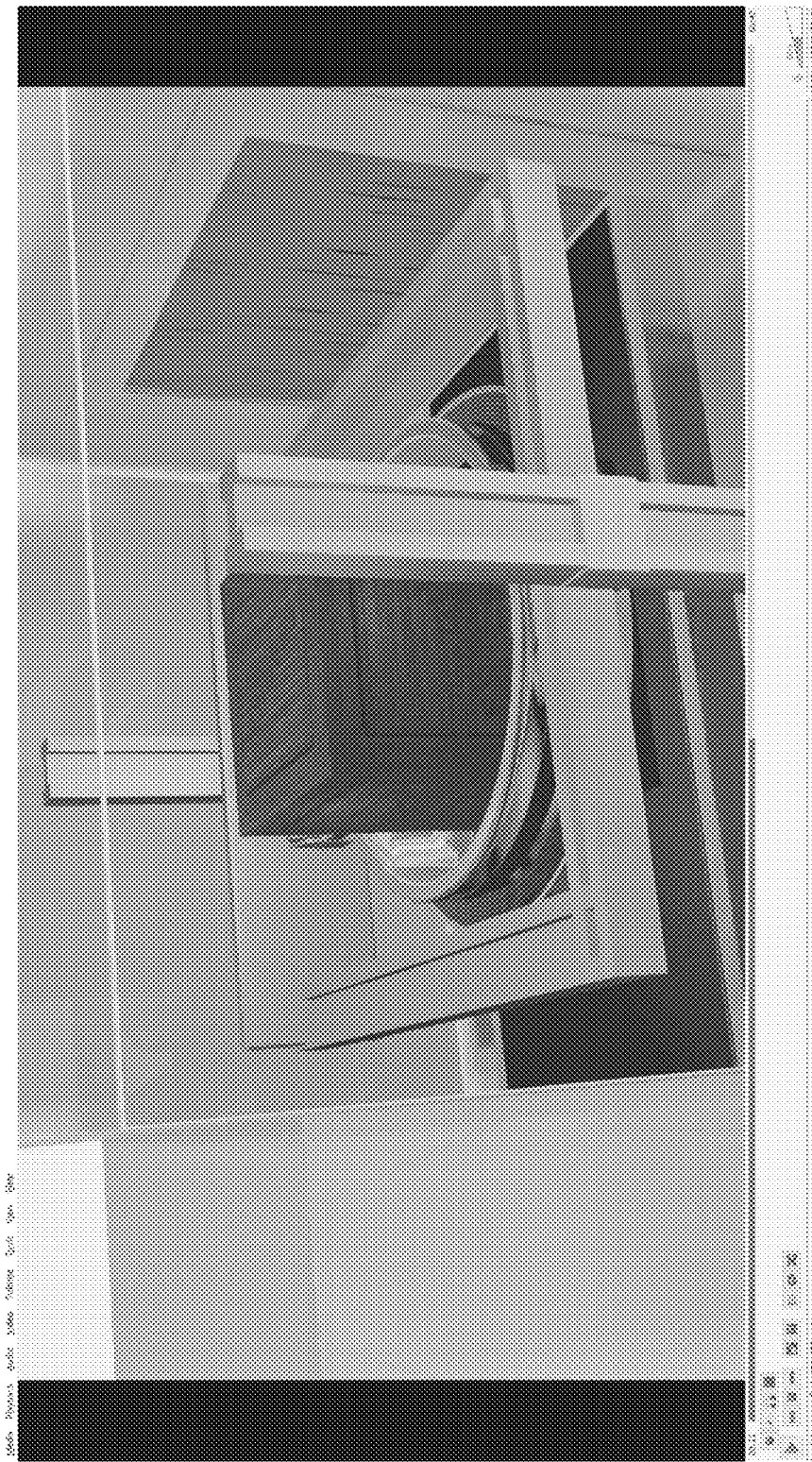
Figure 14:
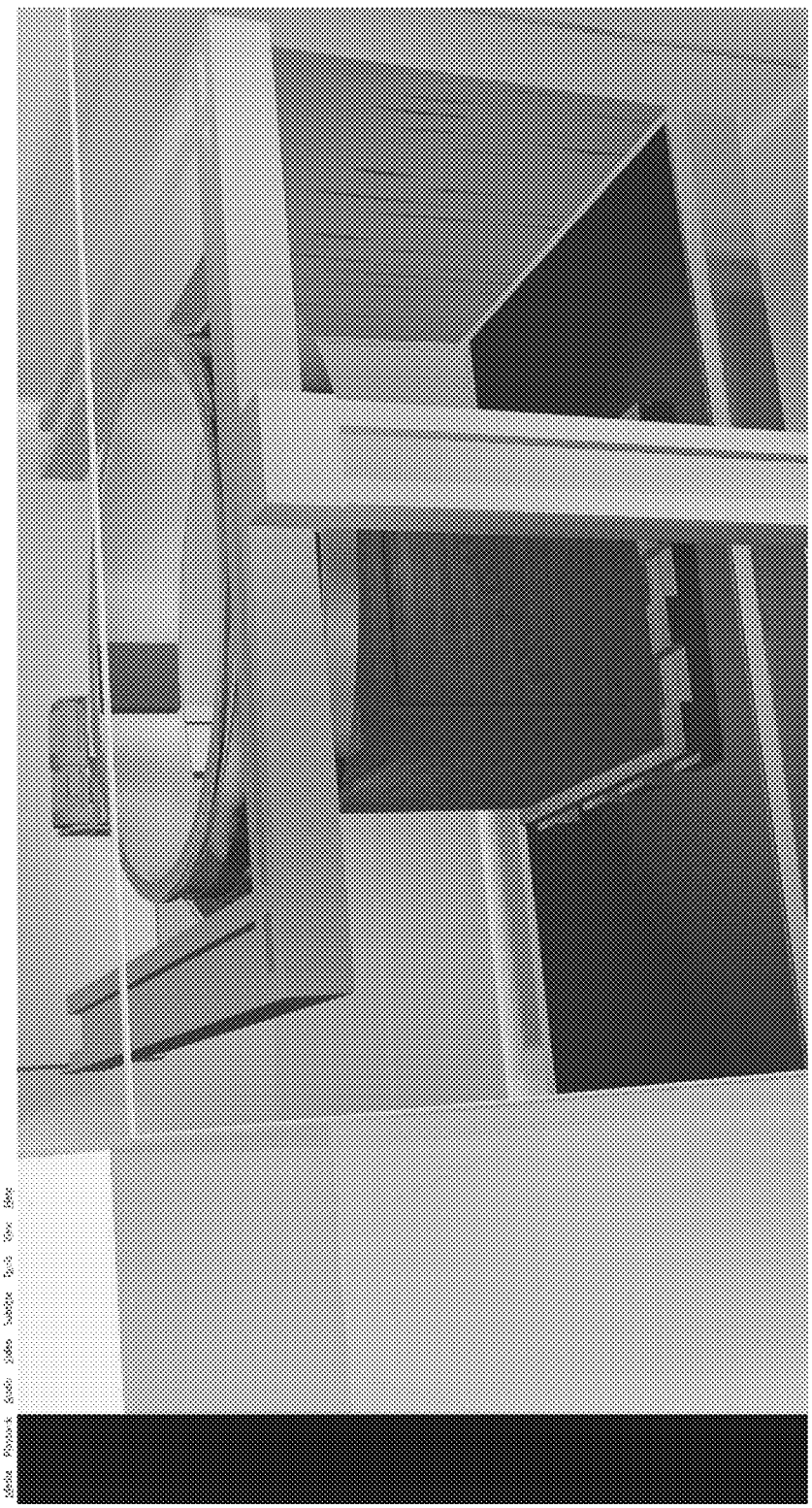
Figure 15:
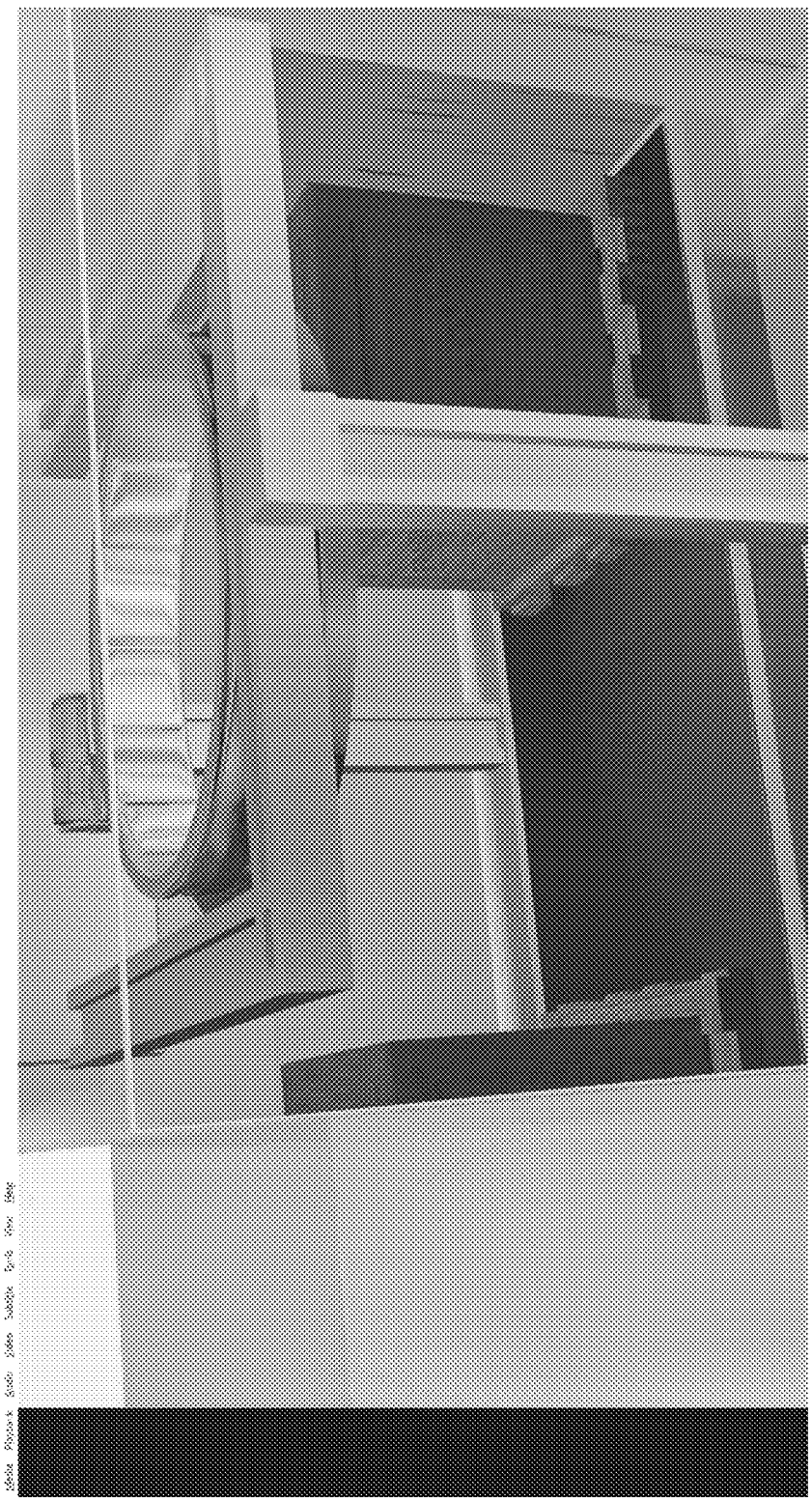
Figure 16:
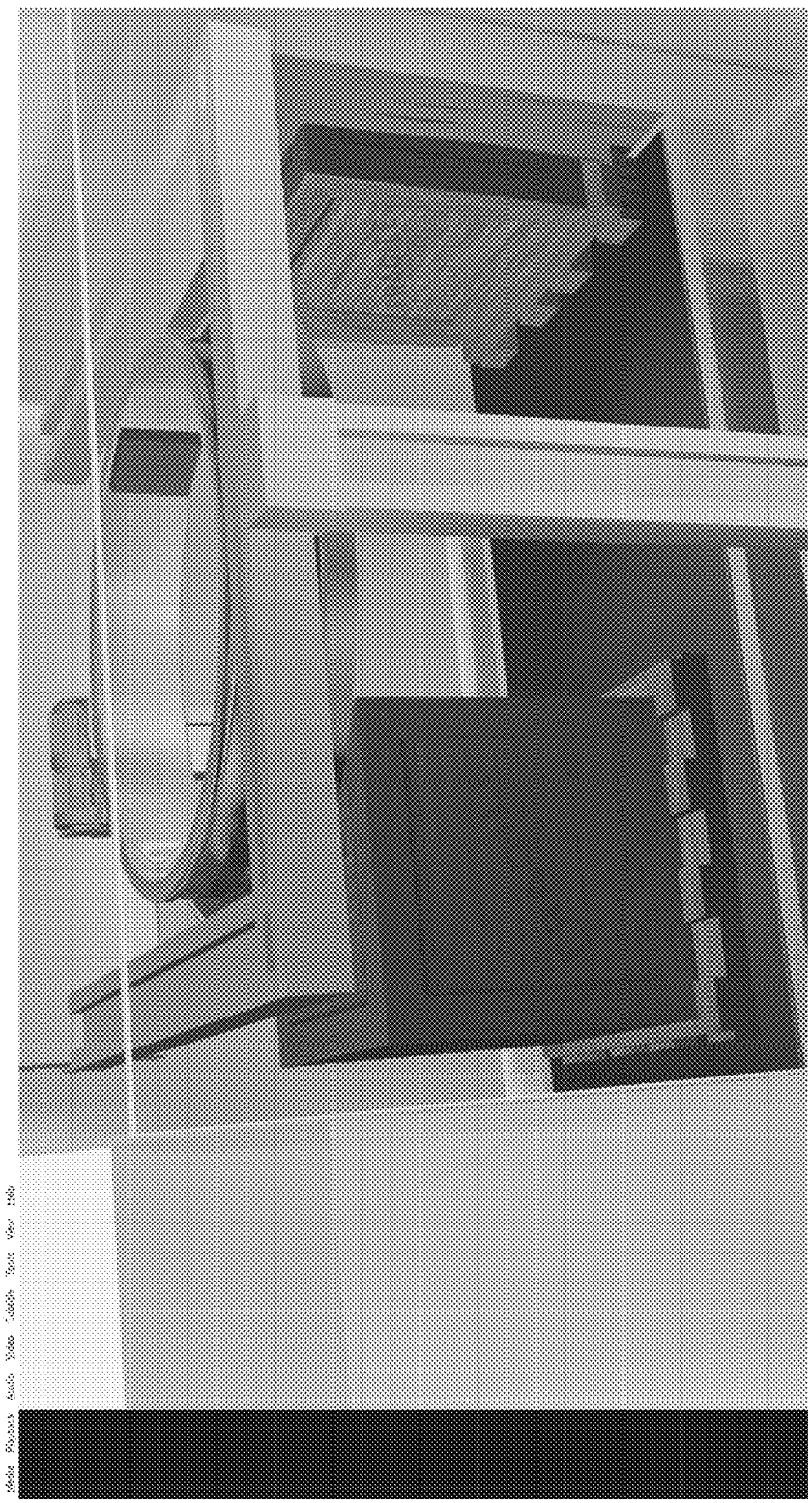
Figure 17:
Figure 18:

Shown in FIGS. 7-17 is a hypothetical execution of scanning operations conducted on multiple pallets. In FIG. 7 a pallet is deposited on the conveyor, and moved into a scanning area in FIG. 8. The scanning platform begins to rotate and scan the object in FIG. 9, and in this example execution scanning from top to bottom. FIGS. 10-13 show the scanning platform moving towards the bottom of the pallet, and once the scan is complete returning to an upper position at FIG. 14. FIGS. 15 and 16 illustrate the scanned object leaving the scanning area with a new pallet coming into the scanning area for scanning. FIG. 17 shows the scanned pallet exiting the scanning system for pickup by a forklift in FIG. 18.

Various aspects and embodiments have been described with respect to the foregoing. However, alternatives may be implemented within the scope of the present application. A scanning system according to the following embodiments may include at least one component described according to the foregoing embodiments of the present application, and/or may be configured and/or arranged substantially similar to previously described embodiments in at least one aspect.

Figure 22A:
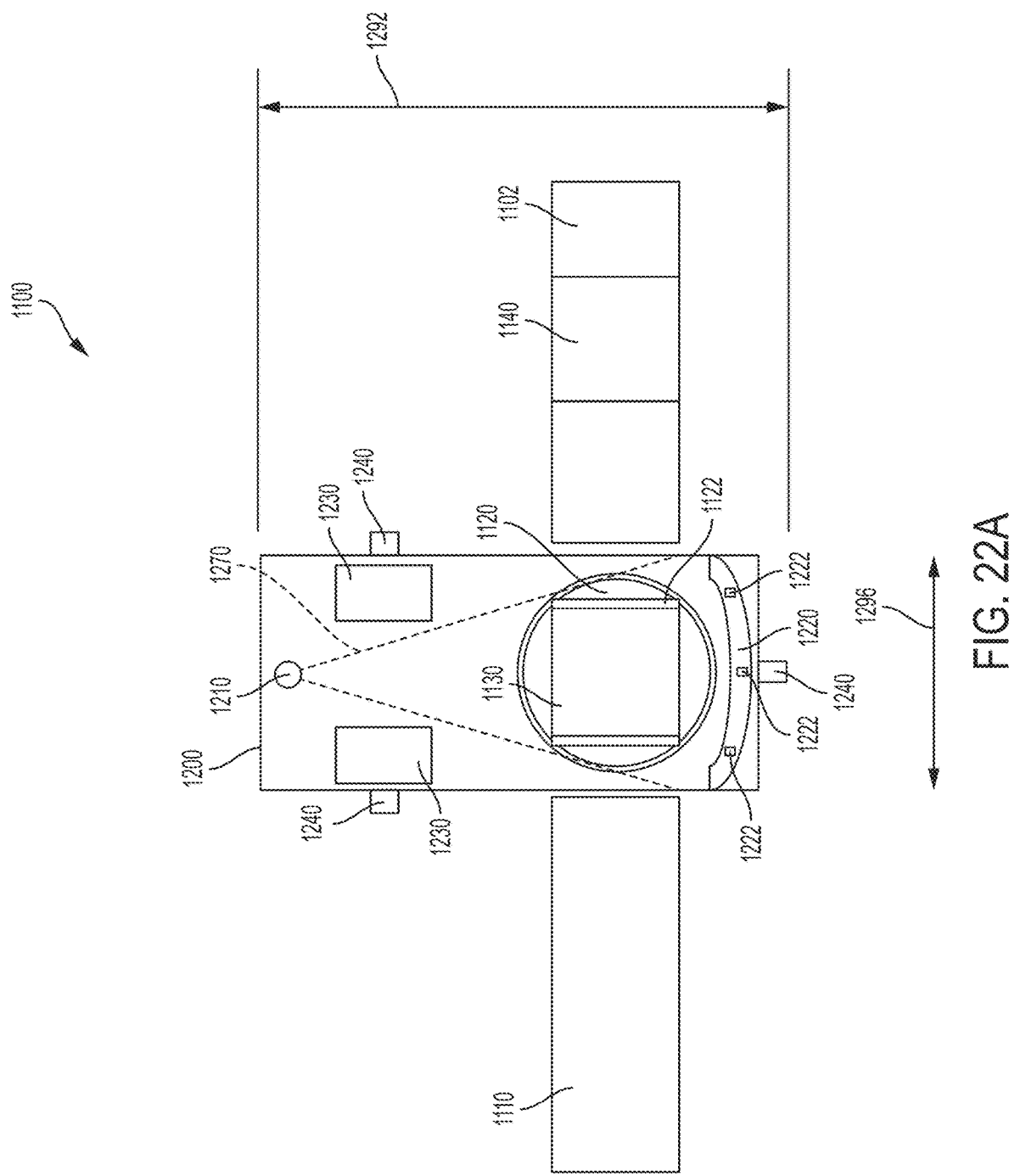
FIG. 22A illustrates a top down view of a scanning system according to some embodiments.
Figure 22B:
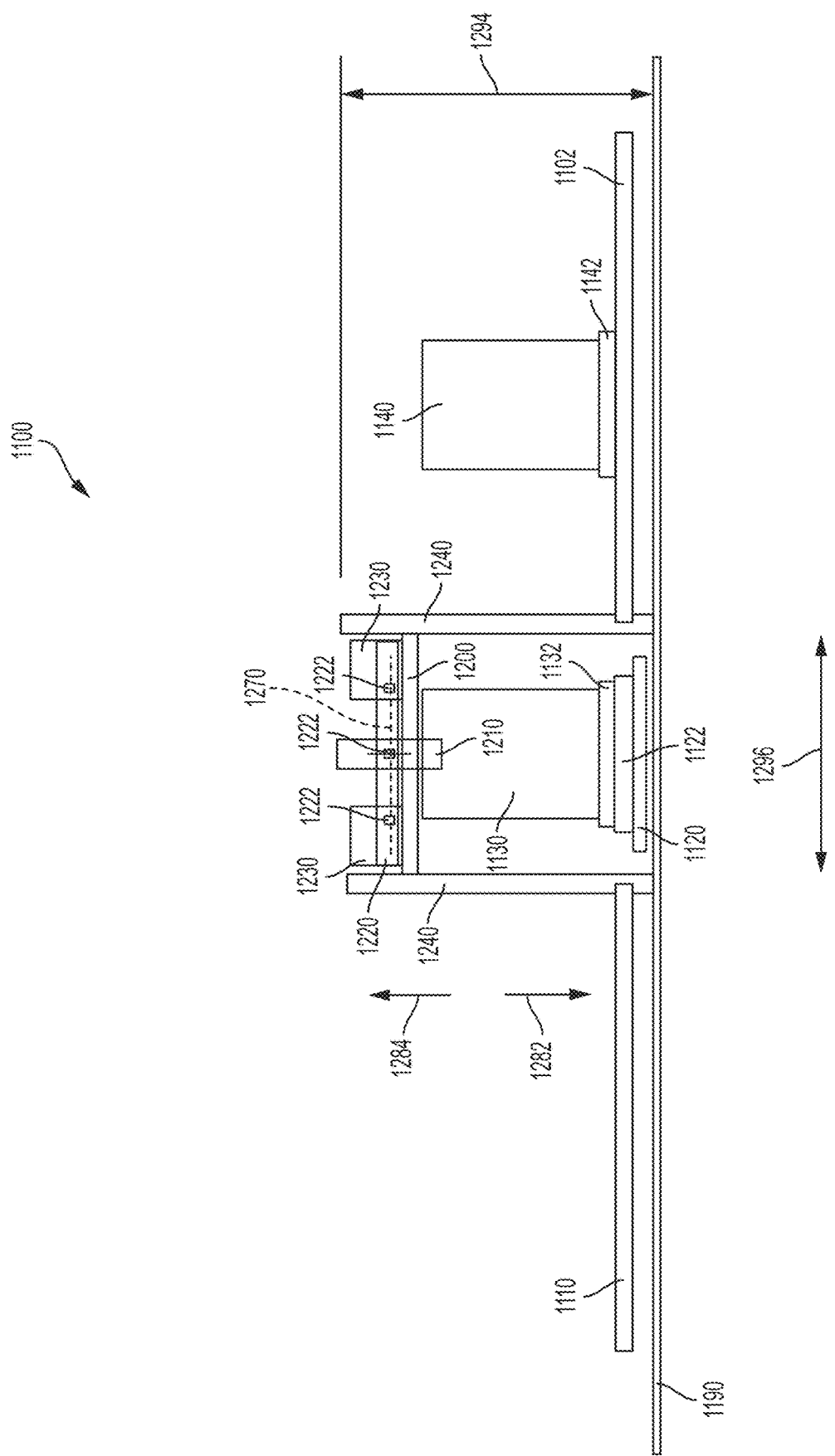
FIG. 22B-C illustrate side views of a scanning system according to some embodiments.
Figure 22C:
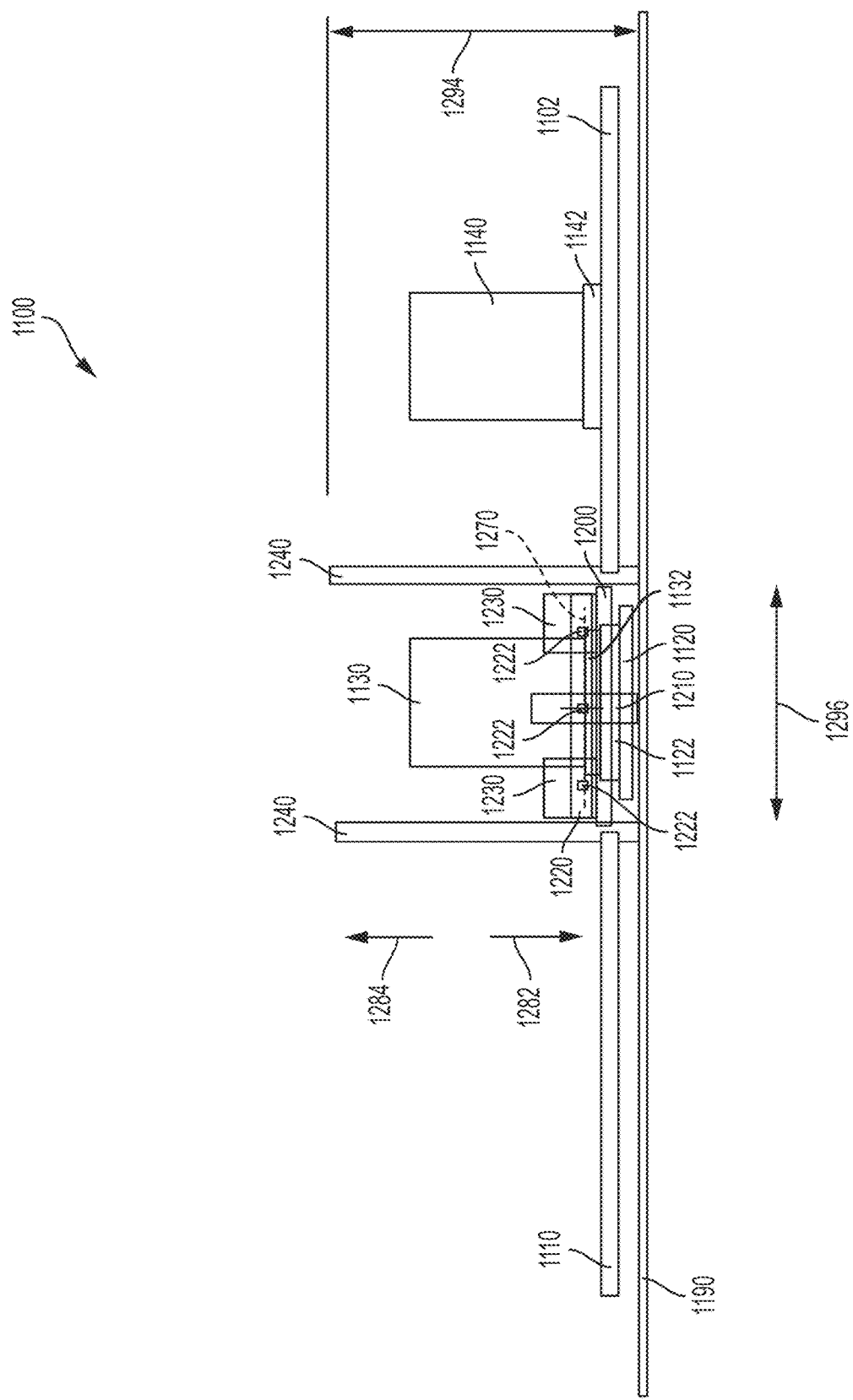

FIGS. 22A-22C shown an illustrative example of an alternative configuration according to the present application. FIGS. 22A-22C show a scanning system 1100. In some embodiments, scanning system 1100 is a horizontal CT scanning system. The scanning system is configured to scan objects, which may be any objects described according to the foregoing, for example, palletized cargo. FIG. 22A is a top view of scanning system 1100. The illustrative embodiment shown in FIGS. 22A-22C show a first object to be scanned 1130 on a first pallet 1132 and a second object to be scanned 1140 on a second pallet 1142.

Scanning system 1100 may include various components. In some embodiments, scanning system 1100 may include a first conveyor 1102. An object 1130, for example, a palletized object or an object for scanning can be placed on the first conveyor 1102. In at least one aspect, the first conveyor 1102 may be arranged substantially similar to the conveyor 102. The scanning system 1100 may include an optional entrance tunnel (not shown). In at least one aspect, the entrance frame may be arranged substantially similar to the entrance frame 104. In one example, various portions of the frame and structure can be constructed of shielding material to absorb, deflect, reflect, or deaden transmission of x-ray energy. According to various embodiments, the scanning system 1100 may include an optional scanning frame (not shown).

In at least one aspect, the scanning frame may be arranged substantially similar to the scanning frame 106. The scanning system 1100 may include an optional exit tunnel (not shown). In at least one aspect, the exit tunnel may be configured substantially similar to the exit tunnel 108. The scanning system may include a second conveyor 1110. In at least one aspect, the second conveyor may be configured substantially similar to the conveyor 102. The scanning system 1100 may be mounted on a mounting surface 1190, which may be, for example, a floor. The scanning system 1100 may include an optional entry portion (not pictured) configured substantially similar in at least one aspect to the entry portion 400 described with respect to FIG. 4.

The scanning system 1100 may include a scanning platform 1200. In at least one aspect, the scanning platform 1200 may be arranged substantially similar to a scanning platform or CT gantry described with respect to the foregoing, for example, the CT gantry 200. The scanning platform 1200 may be substantially rigid. In some embodiments, the scanning platform 1200 may be substantially rigid to ensure that components remain in substantially the same arrangement relative to each other in embodiments in which the scanning platform moves. The scanning platform 1200 may include an opening configured to accept C-type (48 length by 48 inch width by 66 inch height) pallets. The scanning platform 1200 may include various components.

The scanning system 1100 may include a turntable 1120. The turntable may be disposed within a scanning frame, and/or may be positioned under a scanning platform 1200. The turntable 1120 may include a turntable conveyor 1122 configured to move objects onto and off of the turntable. The turntable 1120 may be configured to rotate an object about a vertical axis. In some embodiments, the turntable 1120 may include or be mounted on a lift which configured to raise and lower an object disposed on the turntable. In some embodiments, the turntable 1120 may be circular, which may reduce a spatial volume the turntable intersects while rotating. In some embodiments, the turntable 1120 may be surrounded by rollers configured to move objects onto and off of the turntable and/or onto or off of a conveyor.

The scanning system 1100 may include a scan position. A scan position may be on the turntable 1120. In some embodiments, the scan position is substantially centered on the turntable 1200. The scan position may be under the scanning platform 1200, for example, under an opening in the scanning platform. In some embodiments, the scan position may be substantially centered in the opening of the scanning platform. An object may be moved into and out of the scan position during the scan. The scanning system 1100 may include a scanning area. The scanning area may be defined by the turntable 1120, for example, by the area of the turntable. The scanning area may be defined by the scanning platform 1200, for example, the scanning area may be defined by an area under opening in the scanning platform. An object may be moved into and out of the scanning area during a scan.

According to aspects of the present application, the turntable 1120 may rotate at various rates. In one example, the rotation speed of a turntable 1120 may be 20-40 RPM effectuated by a rotation motor included in or disposed adjacent to the turntable. In some embodiments the rotation speed may be less than 20 RPM, greater than 40 RPM, or in some embodiments, between 20 and 40 RPM. The rotation speed may support the penetration and resolution targets. Further examples are constructed to provide streamlined architecture having a reasonable resulting detector pitch. According to one embodiment, detector pitch is used and is defined as a change in offset between the turntable and the scanning platform during one 360° turntable rotation divided by beam collimation. In some embodiments, the pitch of the scanning system 1100 may be between greater than 1.0, less than 2.5, or, in some embodiments, between 1.0 and 2.5, for example, 1.8. In some embodiments, the pitch may be 0, that is to say, a scan may include one or more full rotations at one or more different heights.

Figure 21A:
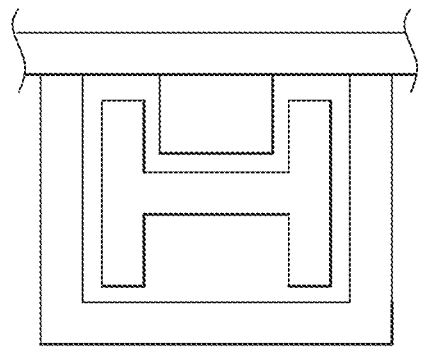
FIGS. 21A-C illustrate a top down view of examples of engagement between a lifting assembly and support members.

In some embodiments, the scanning system 1100 may include at least one lift. The one or more lifts may be configured to change the vertical offset of the scanning platform 1200 relative to the turntable 1120. In the illustrated embodiments of FIGS. 21A-21C, the scanning system 1100 includes three lifts 1240 configured to change the vertical position of the scanning platform 1200, which, when the vertical position of the turntable 1120 is held constant or changed at a different rate, changes the vertical offset of the scanning platform relative to the turntable. However, the application is not limited in this respect, and one or more lifts may be configured to change the vertical position of the turntable 1120. When the vertical position of the turntable is changed, and when the vertical position of the turntable 1120 is held constant or changed at a different rate, the vertical offset of the scanning platform relative to the turntable is changed. The lifts 1240 may be commercially available motorized lifts configured to be responsive to control signals provided by the scanning system. Lifts may be centered about a center of mass of the scanning platform 1200 or the center of mass of the turntable 1120. In some embodiments, the motion of the scanning platform may be guided by at least one support.

In some embodiments, the scanning platform 1200 may include an x-ray emitter assembly. The x-ray emitter assembly may include at least one x-ray emitter 1210. In some embodiments, the scanning platform may include a plurality of x-ray emitters. In at least one aspect, the x-ray emitter 1210 may be configured substantially similar to the x-ray emitter 204. In some embodiments, the x-ray emitter 1210 may be an x-ray tube. In some embodiments, an x-ray tube may have a 1.5 millimeter focal spot. The emitter 1210 may be a 600 KeV 1500 Watt source, and may have a beam angle of 40 degrees. The emitter 1210 may emit x-ray beams arranged in a beam plane, for example beam plane 1270. The emitter 1210 may be arranged at an offset distance from an object to be scanned. The offset distance may be chosen based on object size and beam angle. The emitter may be chosen based on the desired beam energy, for example, higher beam energies may be used in applications where increased penetration is required. Higher power emitters may be desired for scanning of frozen items, for example, frozen foods, or for scanning metallic objects, for example, machinery. According to aspects of the present application, the scanning platform may include at least a first detector assembly 1220. The first detector assemble may be an x-ray detector assembly. The x-ray detector assembly may include at least one x-ray detector 1222. In some embodiments, the first detector assembly 1120 may include a plurality of x-ray detectors 1222 arranged in the beam plane 1270. The scanning system 1100 may be configured using detectors or arrangements of detectors which are substantially similar in at least one aspect to detectors or arrangements of detectors according to other previous embodiments of the present application. In some embodiments detectors may be arranged in 6 rows of 1024 detectors and provide 1.94 millimeters of resolution at isocenter, In some embodiments, detector arrangements may be configured based on an emitter arrangement. In some embodiments, detectors may be arranged according to beam angle and offset from an emitter, that is to say, detectors may be arranged such that they fall within a beam plane of one or more emitters and/or detectors may be arranged such that each detector is disposed substantially the same distance from an emitter, for example, in a convex, curved arrangement.

In some embodiments, the x-ray detector assembly may further include x-ray shielding. In some embodiments, increased penetration of high-energy x-rays requires detectors with significant stopping power. In one example, cadmium tungstate (CdWO4) is employed to provide a detector with high stopping power. Increased shielding or stopping power may be used with higher power emitters.

As describing according to previous embodiments, the use of multiple scanning platforms may provide increased scan speed. Increased scan speed from the use of multiple scanning platforms may be accompanied by additional complexity in the architecture and control algorithms.

According to some embodiments, emitter 1210 and at least some detectors 1222 are positioned on opposite sides of the scanning platform. As is known, x-ray attenuation data obtained by passing x-rays through an object allow construction of a model of the scanned object.

The scanning system 1100 may further include a high voltage power supply (HVPS) 1230. FIG. 22A-22C show a scanning system 1100 including two high voltage power supplies 1230. In at least one aspect, a HVPS 1230 may be configured substantially similar to other high voltage power supplies described according to the forgoing. For example, a scanning system 1100 may include HVPS pair which may be an off the shelf component, which may be a 320 kilovolt 4500 watt high voltage power supply which provides 14 mA of current and matching x-ray. In other embodiments, increased voltage sources can be used to improve scanning penetration on an object and assist with scanning of higher density objects, for example, 450 kilovolt 4500 watt supplies. In some examples, the scanning system 1100 is constructed to allow switching between the lower voltage x-ray source and the higher voltage x-ray source. The HVPS 1230 may be electrically coupled to and/or provide power to both the x-ray emitter 1210 and/or the detector assembly 1220, as well as to other electrical components of the scanning system 1100.

The HVPS may be configured in different arrangements relative to the scanning platform 1200. In some embodiments, the HVPS 1230 may be mechanically coupled to the scanning platform 1200 and/or disposed on the scanning platform such that the HVPS moves along with the scanning platform when the scanning platform moves. However, the application is not limited in this respect, and the HVPS 1230 may be arranged in configurations where it does not move along with the scanning platform 1200. In embodiments which include larger x-ray emitters, the scanning system 1100 may include a higher powered HVPS, which may enable higher penetration by an emitter.

In some embodiments, the scanning system 1100 may be at least partially enclosed by at least one structure to limit radiation. In some embodiments, the scanning system 1100 may include shielding, for example a shielding wall or a radiation door which can open and close. In some embodiments, the scanning system 1100 may include a structure configured to limit access to an area surrounding the scanning system, for example, a setback fence which may be configured to provide a setback distance from the scanning system. In some embodiments, the scanning system 1100 may be disposed below a surface, for example, in a void or hole in the ground, which may both contribute to shielding and to limit access to an area surrounding the scanning system.

Figure 21B:
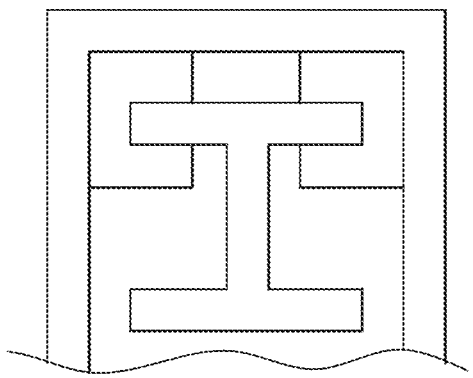
Figure 21C:
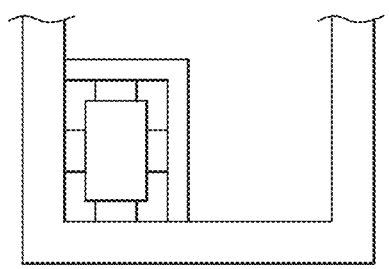

As shown in FIG. 21B, an object 1130 may positioned by the first conveyor 1102 in the center of the scanning frame. The object 1130 may be on a pallet 1132. The object 1130 may be positioned by the first conveyor 1102 onto turntable 1120. Once the object 1130 is positioned, the scanning platform 1200 may be lowered into a scanning position at the top of the object, the base of the object, or another height relative to the object. The object 1130 may be rotated on the turntable and the x-ray emitter 1210 and the detectors 1222 may be raised and/or lowered with the scanning platform 1200 along the height of the object. In some embodiments, the scan may begin at the top of the object 1130 and end at the bottom of the object. In some embodiments, the scan begin at the bottom of the object 1130 and end at the top of the object. The scanning platform 1200 and/or the turntable may each be lowered (e.g., arrow 1282) and/or raised (e.g., arrow 1284), depending on the scan direction.

Resulting data may be processed and/or visualized in at least one way. In some embodiments, the resulting data is directly visualized as a three dimensional model of the contents of the scanned object. Further processing may include anomaly or threat detection based on the scan data. Scan data may include x-ray attenuation data. According to some embodiments, scans of the object are executed from the base of the object to the top of the object, although scanning may occur in the opposite direction.

According to aspects of the present application, reconstruction algorithms may be used in conjunction with scan data by scanning system 1100. The scanning system 1100 may use reconstruction algorithms which are substantially similar in at least one aspect to reconstruction algorithms described according to previous embodiments.

According to aspects of the present application, detection algorithms may be implemented by scanning system 1100. The scanning system 1100 may use detection algorithms which are substantially similar in at least one aspect to detection algorithms described according to previous embodiments.

According to some embodiments, system 1100 may implement various software applications, for example, imaging plane software, three-dimensional image construction, and/or the displaying of a three-dimensional image, as described with respect to previous embodiments. Imaging may include a resolution of 1.94 millimeters at isocenter, a slice thickness of 2 millimeters, and a voxel size of 2 millimeters.

FIGS. 22A-22C illustrate some example dimensions of the scanning system 1100. In FIG. 22A, dimension 1292 may indicate a maximum width of the scanning system 1100. In some embodiments, the dimension 1292 may indicate a width of a scanning frame and/or the scanning platform 1200. In some embodiments, the width may be along a direction substantially perpendicular to the motion of objects along a conveyor (e.g., first conveyor 1102 and/or second conveyor 1110) of the scanning system 1100. The width may be arranged substantially parallel to a plane of a surface upon which the scanning system is disposed, for example, a floor. In some embodiments, the dimension 1292 be substantially 18 feet. In some embodiments, dimension 1292 may be other lengths, for example, greater than 16 feet, less than 20 feet, or, in some embodiments, between 16 and 20 feet.

In FIGS. 22B and 22C, dimension 1294 indicates an example for a maximum height of the scanning system 1100. In some embodiments, the dimension 1294 may indicate a height of a scanning frame and/or the scanning platform 1200. In some embodiments, the height may be along a direction substantially perpendicular to the motion of objects along a conveyor (e.g., first conveyor 1102 and/or second conveyor 1110) of the scanning system 1100. The width may further be arranged substantially perpendicular to a plane of a surface upon which the scanning system is disposed, for example, a floor. In some embodiments, the dimension 1294 be between 10 and 11 feet, for example 11 feet. In some embodiments, dimension 1294 may be other lengths, for example, greater than 8 feet, less than 13 feet, or, in some embodiments, between 8 and 13 feet.

In FIGS. 22A-22C, dimension 1296 may indicate a maximum length of the scanning platform 1200. In some embodiments, the length may be along a direction substantially parallel to the motion of objects along a conveyor (e.g., first conveyor 1102 and/or second conveyor 1110) of the scanning system 1100. In some embodiments, the dimension 1296 be substantially 8 feet. In some embodiments, the dimension 1296 be greater than 6 feet, less than 10 feet, or, in some embodiments, between 6 and 10 feet.

According to aspects of the present application, the scanning system 1100 may address the most challenging C size cargo pallets (of 48 inch by 48-inch-wide by 65 inch high), for example, based on the dimensions described in FIGS. 22A-22C. Additional embodiments provide for scanning of objects of greater dimensions. For example, various embodiments are dimensioned to receive and scan objects measuring up to thirty six inches by thirty six inches (length by width) and having a height of up to eight four inches. By utilizing a horizontally-mounted turntable 1120, the scanning system architecture minimizes the size of scanning platform 1200 and scanning system 1100, which may further maximize the photon energy penetrating the object to be scanned (e.g., a pallet). The scanning system 1100 may be used for scanning objects having frozen items, for example, frozen foods, or for objects having metallic objects, for example, machinery.

Figure 23:
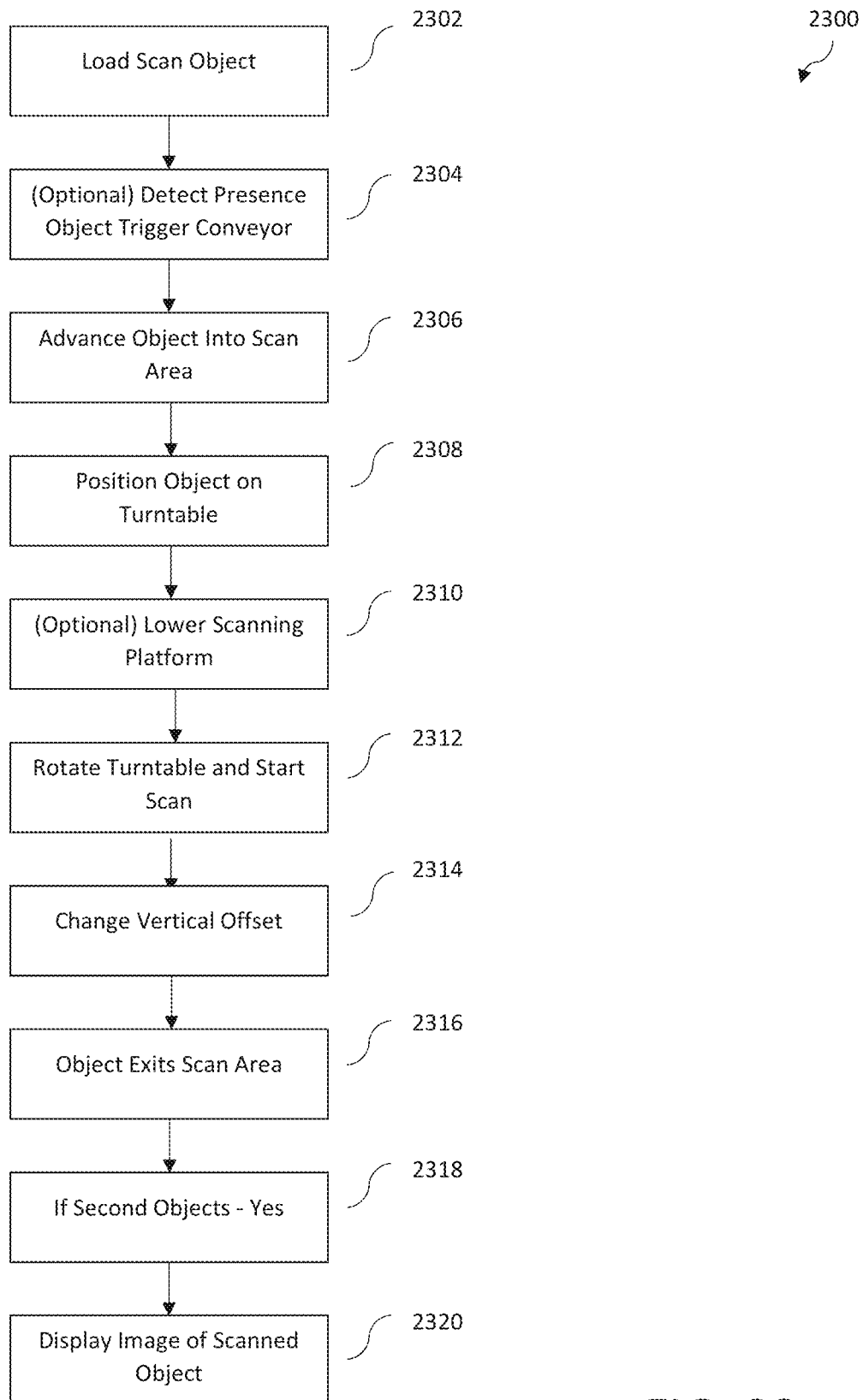
FIG. 23 is an example process flow for capturing scan data, according to one embodiment.

FIG. 23 is an example process flow 2300, which may be executed by a scanning system (e.g., 1100). According to one embodiment, process 2300 may enable scanning of 8 or more, 10 or more, or, in some embodiments, 20 or more C-sized pallets per hour by the scanning system (e.g., 1100).

Process 2300 begins at 2302 with loading an object (e.g., 1130), which may be on pallet (e.g., 1132), to be scanned onto a conveyor belt. Optionally, at 2304 the system can detect the presence of the object 1130 (e.g., via weight, light or motion sensors, among other examples). At 2306 the conveyor belt is activated to advance the object 1130 into a scanning area.

According to one embodiment, the conveyor feed and exit belts move at a speed of 20 cm/sec. Such conveyors are can be used with conventional x-ray cargo pallet scanners, and are capable of moving the object (e.g., 1130) into position for the scanning platform. In one example, the time to position takes approximately 25 seconds from initial loading. In various embodiments, follow-on objects (e.g., pallets) can be staged and centered for scanning. In some examples, positioning of subsequent objects can take approximately another 10 seconds by queuing the objects on the conveyor. In some embodiments, the actual time for the scanning platform to be lowered into position and to scan an entire (e.g., 65 inch high) pallet may be approximately 30 seconds.

At 2308, the object (e.g., 1130) is moved from the conveyor into a center position on the turntable 1120. Optionally, the system can include radiation doors that may be shut for safety. In some embodiments, positioning ramps are constructed on either side of the conveyor belt and/or turntable to facilitate centering of the object in the CT area on the turntable 1120. In other embodiments, actuators or push arms can be configured to center the object. Further, various sensors can facilitate or validate a centered position.

In yet other embodiments, the turntable 1120 can include locking members or anchors (not shown) configured to hold an object to be scanned in place. For example, a pallet may not have uniform weight distribution, and the anchors or locking members can be fixed (e.g., by pressure) to the base of the object to be scanned to ensure proper positioning during rotation.

At 2310, the scanning platform 1200 is optionally lowered to the bottom of the object 1130, the top of the object, or another height of the object. In embodiments where the scanning platform 1200 is stationary, 2310 may not be executed. The imaging of the object 1130 begins at 2312. For example, at 2312, the turntable 1120 is triggered to rotate at a speed of 60 Revolution per Minute (RPM) (e.g., which is sufficient to obtain the 360° scan at a pitch of 1.29). Other embodiments, use different rotation speeds, for example, tailored to the pitch of the source). At 2314 a vertical offset between the scanning platform and the turntable is changed. In some embodiments, the scanning platform 1200 may be moved upward or downwards depending on the starting position of the scanning platform in 2310. For example, if the scanning platform 1200 is at the bottom of the object 1130 at 2310, the scanning platform is moved upwards at 2314. If the scanning platform 1200 is at the top of the object 1130 at 2310, the scanning platform is moved downwards at 2314.

According to one alternative, rather than move the scanning platform vertically, the object itself is both rotated and lifted or lowered to enable a full three dimension capture using a fixed position x-ray source. For example, in some embodiments, the turntable 1120 may move the object 1130 upwards and downwards relative to a stationary scanning platform. For example, the scanning platform 1200 may raise and lower at a rate of 1.5 cm/second. In some embodiments, lifts are given control signals to lower the scanning platform 1200 into place and then raise the scanning platform to fully scan the object 1130, while the object is rotating.

In some embodiments, the system can perform validation operations to confirm that an object is completely scanned and enough image data has been obtained to analyze, for example, any threats Once the object 1130 is completely scanned, any radiation doors can open at 2316, and the object exits the turntable by operation of a conveyor belt. Optionally at 2318, if a second object 1140 is present to scan, the queued object enters the CT area as the first object leave, re-executing steps 2308 on. According to various embodiments, the generated image (from the CT scan) is displayed to an end user in near instantaneous time as the reconstruction occurs incrementally during the pallet scan (e.g., at 2320).

Figure 19:
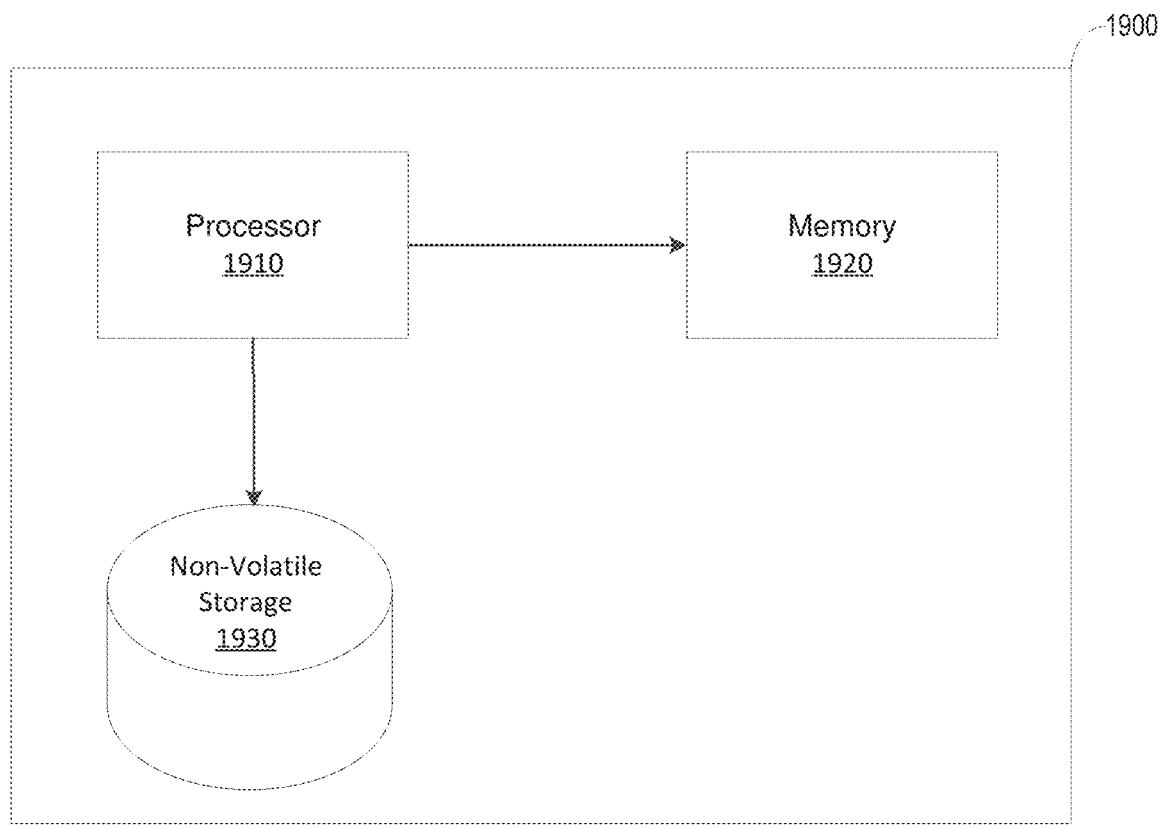
FIG. 19 is a block diagram of a computer system on which various functions can be implemented.
Figure 20A:
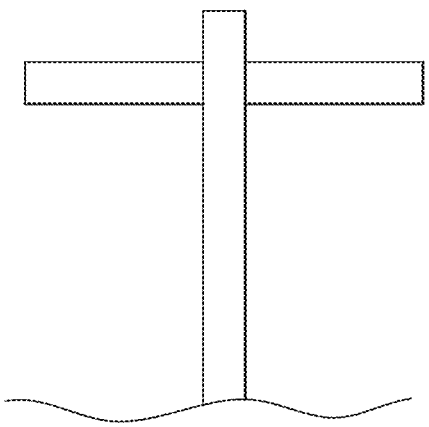
FIGS. 20A-D illustrate a side view of example support members for supporting a scanning platform.
Figure 20B:
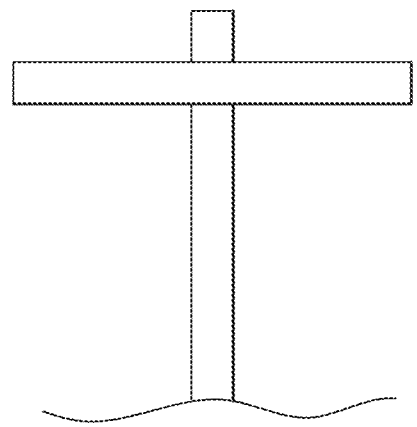
Figure 20C:
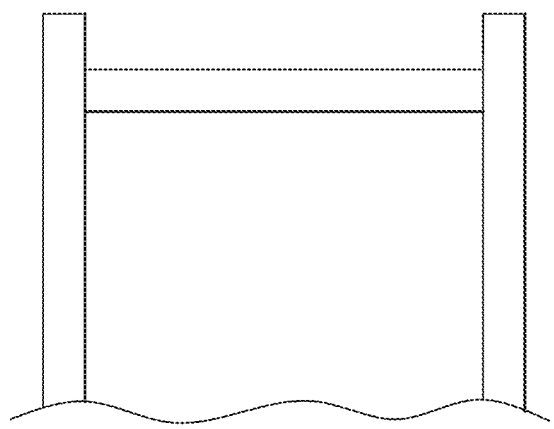
Figure 20D:
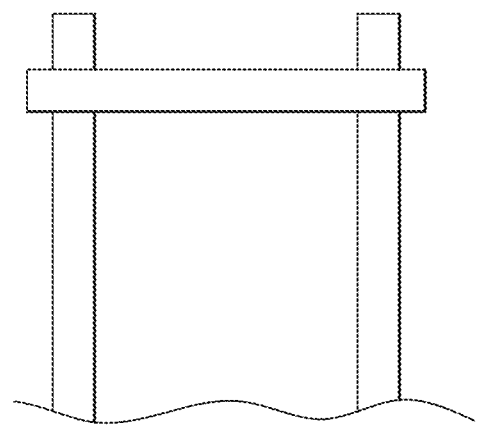

Modifications and variations of the discussed embodiments will be apparent to those of ordinary skill in the art and all such modifications and variations are included within the scope of the appended claims. An illustrative implementation of a computer system 1900 that may be used in connection with any of the embodiments of the disclosure provided herein is shown in FIG. 19. The computer system 1900 may include one or more processors 1910 and one or more articles of manufacture that comprise non-transitory computer-readable storage media (e.g., memory 1920 and one or more non-volatile storage media 1930). The processor 1910 may control writing data to and reading data from the memory 1920 and the non-volatile storage device 1930 in any suitable manner. To perform any of the functionality described herein (e.g., image reconstruction, anomaly detection, etc.), the processor 1910 may execute one or more processor-executable instructions stored in one or more non-transitory computer-readable storage media (e.g., the memory 1920), which may serve as non-transitory computer-readable storage media storing processor-executable instructions for execution by the processor 1910.

The terms "program" or "software" are used herein in a generic sense to refer to any type of computer code or set of processor-executable instructions that can be employed to program a computer or other processor to implement various aspects of embodiments as discussed above. Additionally, it should be appreciated that according to one aspect, one or more computer programs that when executed perform methods of the disclosure provided herein need not reside on a single computer or processor, but may be distributed in a modular fashion among different computers or processors to implement various aspects of the disclosure provided herein. Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Also, various inventive concepts may be embodied as one or more processes, of which examples (e.g., the processes described with reference to FIG. 3) have been provided. The acts performed as part of each process may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, and/or ordinary meanings of the defined terms. As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A scanning apparatus, the apparatus comprising:
a scanning platform including an emitter and a detector;
a turntable configured to rotate responsive to control signals;
a lift configured to change a vertical offset of the scanning platform relative to the turntable, responsive to control signals; and
at least one processor when executing configured to:
receive imaging data from the detector;
generate control signals for changing the vertical offset of the scanning platform relative to the turntable;
generate control signals for rotating the turntable; and
capture x-ray attenuation data for an object in three dimensions.

2. The scanning apparatus of claim 1, wherein the scanning platform is constructed and arranged on a horizontal plane relative to an installed surface.

3. The scanning apparatus of claim 1, wherein the lift is configured to change the height of the scanning platform.

4. The scanning apparatus of claim 1, wherein the lift is configured to change the height of the turntable.

5. The scanning apparatus of claim 1, wherein the scanning platform is constructed and arranged to accept large pallets having dimensions of at least 48 inch length, by 48-inch width, by 65 inch height.

6. The scanning apparatus of claim 1, further comprising a first conveyor assembly configured to receive an object to be scanned.

7. The scanning apparatus of claim 6, wherein the first conveyor assembly is responsive to control signals from the at least one processor to move the object into a scanning area on the turntable.

8. The scanning apparatus of claim 1, further comprising positioning sensors that identify when the object is within an opening in the scanning platform, the opening configured to accept the object.

9. The scanning apparatus of claim 1, further comprising a first conveyor assembly responsive to control signals from the at least one processor to position the object under an opening in the scanning platform, the opening configured to accept the object.

10. The scanning apparatus of claim 1, further comprising an entry housing constructed to support a conveyor and receive a pallet for scanning.

11. The scanning apparatus of claim 1, further comprising an exit housing constructed to support a conveyor and position a pallet for retrieval.

12. The scanning apparatus of claim 1, wherein the at least one processor is configured to reconstruct an image of the object from the x-ray attenuation data.

13. The scanning apparatus of claim 1, further comprising a high voltage power source coupled to the scanning platform and configured to move with the scanning platform.

14. The scanning apparatus of claim 7, further comprising a second conveyor assembly configured to move the object out of the scanning area responsive to control signals from the at least one processor.

15. A scanning system for generating computer tomography ("CT") images, the system comprising:
  at least one processor operatively connected to a memory, the at least one processor when executing configured to:
    activate a rotating turntable;
    change a vertical offset of a scanning platform including an emitter and a detector, relative to the turntable; and
    receive x-ray attenuation data from the detector.

16. The scanning system of claim 15, wherein the processor is further configured to generate a three dimensional image of an object from the x-ray attenuation data.

17. The system of claim 15, wherein the at least one processor is configured to move an object to be scanned using a conveyor to position the object in a scanning area under the scanning platform.

18. A method for capturing computer tomography ("CT") images of an object, the method comprising:
  activating, by at least one processor, a rotating turntable;
  changing a vertical offset of a scanning platform including an emitter and a detector, relative to the turntable, responsive to control signals from the at least one processor; and
  receiving, by the at least one processor, x-ray attenuation data from the detector.

19. A non-transitory computer-readable medium comprising instruction, the instruction when executed cause a computer system to perform a method for capturing computer tomography ("CT") images of an object, the method comprising:
  activating, by at least one processor, a rotating turntable;
  changing a vertical offset of a scanning platform including an emitter and a detector, relative to the turntable, responsive to control signals from the at least one processor;
  receiving, by the at least one processor, x-ray attenuation data from the detector;
  generating a three dimensional image of an object from the x-ray attenuation data.

20. The method of claim 19, further comprising generating a three dimensional image of an object from the x-ray attenuation data.

21. The scanning apparatus of claim 14, wherein the at least one processor activates the lift to position the scanning platform above a path of the object during movement into the scanning area.

* * * * *